(12) United States Patent  
Maxwell et al.

(10) Patent No.: US 7,596,266 B2  
(45) Date of Patent: Sep. 29, 2009

(54) METHOD AND SYSTEM FOR SEPARATING ILLUMINATION AND REFLECTANCE USING A LOG COLOR SPACE

(75) Inventors: Bruce Allen Maxwell, Springfield, PA (US); Casey Arthur Smith, Ithaca, NY (US); Richard Mark Friedhoff, New York, NY (US)

(73) Assignee: Tandent Vision Science, Inc., San Francisco, CA (US)

( * ) Notice: Subject to any disclaimer, the term of this patent is extended or adjusted under 35 U.S.C. 154(b) by 702 days.

(21) Appl. No.: 11/403,719

(22) Filed: Apr. 13, 2006

(65) Prior Publication Data

US 2007/0242878 A1     Oct. 18, 2007

(51) Int. Cl.
*G06K 9/00*     (2006.01)

(52) U.S. Cl. .................. 382/167; 382/162; 382/168

(58) Field of Classification Search ............... 382/156, 382/168, 162, 167, 163, 166; 348/222.1, 348/E9.01, 229.1; 345/589; 350/1.9; 235/469, 235/454, 462.41
See application file for complete search history.

(56) References Cited

U.S. PATENT DOCUMENTS

| | | | | |
|---|---|---|---|---|
| 5,426,517 | A |  6/1995 | Schwartz ................... 358/520 |
| 6,211,971 | B1 * | 4/2001 | Specht ....................... 358/1.9 |
| 2001/0000025 | A1 | 3/2001 | Darrell et al. ................ 382/103 |
| 2002/0165837 | A1 | 11/2002 | Zhang et al. .................. 706/16 |
| 2002/0176001 | A1 | 11/2002 | Trajkovic .................... 348/169 |
| 2005/0100220 | A1 | 5/2005 | Keaton et al. ................ 382/191 |
| 2005/0180639 | A1 | 8/2005 | Trifonov et al. ............. 382/225 |
| 2006/0177149 | A1 | 8/2006 | Friedhoff et al. ............ 383/274 |

OTHER PUBLICATIONS

K. Barnard and G. Finlayson, *Shadow Indentificatin Usign Colour Ratios*, 2002.
K. Barnard, G.D. Finlayson and B. Funt, *Color Constancy for Scenes with Varying Illumination*, Computer Vision and Image Understanding, 65(2): 311-321, Feb. 1997.
H.G. Barrow and J.M. Tenenbaum, *Recovering Intrinsic Scene Characteristics from Imag*, Computer Vision Systems, pp. 3-26, 1978.
C.F. Borges, *A Trichromatic Approximation Method for Surface Illumination*, Journal of Optical Society of America A, 8(8): 1319-1323., Aug. 1991.
M.S. Drew, G.D. Finlayson and S.D. Horley, *Recovery of Chromaticity Image Free from Shadows via Illumination Invariance*, Proceedings of IEEE Workshop on Color and Photometric Methods in Computer Vision, Nice, France 2003, pp. 32-39.

(Continued)

*Primary Examiner*—Anh Hong Do
(74) *Attorney, Agent, or Firm*—Davidson, Davidson & Kappel, LLC; Felix L. D'Arienzo, Jr.

(57) ABSTRACT

In a first exemplary embodiment of the present invention, an automated, computerized method for generating an illumination invariant, chromaticity representation of an image is provided. The method of the present invention comprises the steps of providing an image comprising an array of pixels, each pixel having N band color values, transforming the N bands to log color space values in a log color space, generating a bi-illuminant chromaticity plane in the log color space and projecting the log color space values to the chromaticity the plane to provide chromaticity representation values corresponding to the pixels of the image.

29 Claims, 16 Drawing Sheets

Manually creating an illumination invariant chromaticity plane

OTHER PUBLICATIONS

G.D. Finlayson, S.D. Horley and M.S. Drew, *Removing Shadows from Images*, 2002, pp. 2-14.

G.D. Funklea and R. Bajcsy, *Combining Color and Geometry for the Active, Visual Recognition of Shadows*, University of Pennsylvania Department of Computer & Information Science Technical Report No. MS-CIS-94-62, 1994.

R. Gershon, A.D. Jepson and J. K. Tsotsos, *Ambient Illumination and the Determination of Material Changes*, Journal of Optical Society of America A, 3(10):1700-1707, 1986.

J.M. Geusebroek, R.v.d. Bommgard and A.W.M. Smeulders, *Color Invariance*, IEEE Trans. On Pattern Analysis and Machine Intelligence, 23(12)1338-1350, Dec. 2001.

G.E. Healey, *Using Color for Geometry-Insensitive Segmentation*, Journal of Optical Society of America A, 6(6):920-937, Jun. 1989.

B.K.P. Horn, *Determining Lightness from an Image*, Computer Graphics and Image Processing, 3(1):277-299, Dec. 1974.

G.J. Klinker, S.A. Shafer and T. Kanade, *A Physical Approach to Color Image Understanding*, International Journal of Computer Vision, 4(1): 7-38, Jan. 1990.

E.H. Land and J.J. McCann, *Lightness and Retinex Theory*, Journal of Optical Society of America A, 61:1-11, 1971.

M.S. Langer, *When Shadows Become Interreflections*, International Journal of Computer Vision, 34(2/3), 193-204, 1999.

J.A. Marchant and C.M. Onyango, *Shadow-Invariant Classification for Scenes Illuminated by Daylight*, Journal of Optical Society of America A, 17(11), Nov. 2000.

S.K. Nayar, K. Ikeuchi and T. Kanade, *Shape from Interreflections*, IEEE International Conference onn cOmputr Vision (ICCV), pp. 2-11, Dec. 1990.

I. Omer and M. Werman, *Color Lines: Image Specific Color Representation*, Proceeding of IEEE Conference on Computer Vision and Patter Recognition, pp. 946-953, Jun. 2004.

S.A Shafer, *Using Color to Separate Reflection Components*, Computer Science Department University of Rochester, TR 136, Apr. 1984.

S. Tominaga, *Surface Identification Using Dichromatic Reflection Model*, IEEE Transactions of Pattern Analysis and Machine Intelligence, 13(7), pp. 658-670, Jul. 1991.

S. Tominaga and N. Tanaka, *Estimating Reflection Parameters from a Single Color Image*, IEEE Comput. Graph. Appl., 20(5):58-66, 2000.

J.v.d. Weijer and C. Schmid, *Coloring Local Feature Extraction*, pp. 1-14.

Hooke, R. and Jeeves, T. A. "Direct Search Solution of Numerical and Statistical Problems," *Journal of the Association of Computing Machinery (JACM)*. Apr. 1961: vol. 8, Issue 2, pp. 212 to 229.

Kirkpatrick, S., Gelatt, C. D. and Vecchi, M. P. Optimization by Simulated Annealing, *Science*. May 13, 1983: vol. 220, No. 4598, pp. 671 to 680.

Reeves, C., ed. *Modern Heuristic Techniques for Combinatorial Problems*. New York: John Wiley and Sons, Inc., 1993 ISBN:0-470-22079-1.

Finlayson, G. et al. "On the Removal of Shadows From Images," *IEEE Transactions on Pattern Analysis and Machine Intelligence*. Jan. 2006, vol. 28, No. 1, pp. 59 to 68.

Finlayson, G. et al. "Intrinsic Images by Entropy Minimization," May 2004: European Conference on Computer Vision, Prague, May 2004. Springer Lecture Notes in Computer Science, vol. 3023, pp. 582 to 595.

Finlayson, G. et al. "Color constancy at a pixel," J. Opt. Soc.Am. A. vol. 18, No. 2, Feb. 2001, pp. 253-264.

* cited by examiner

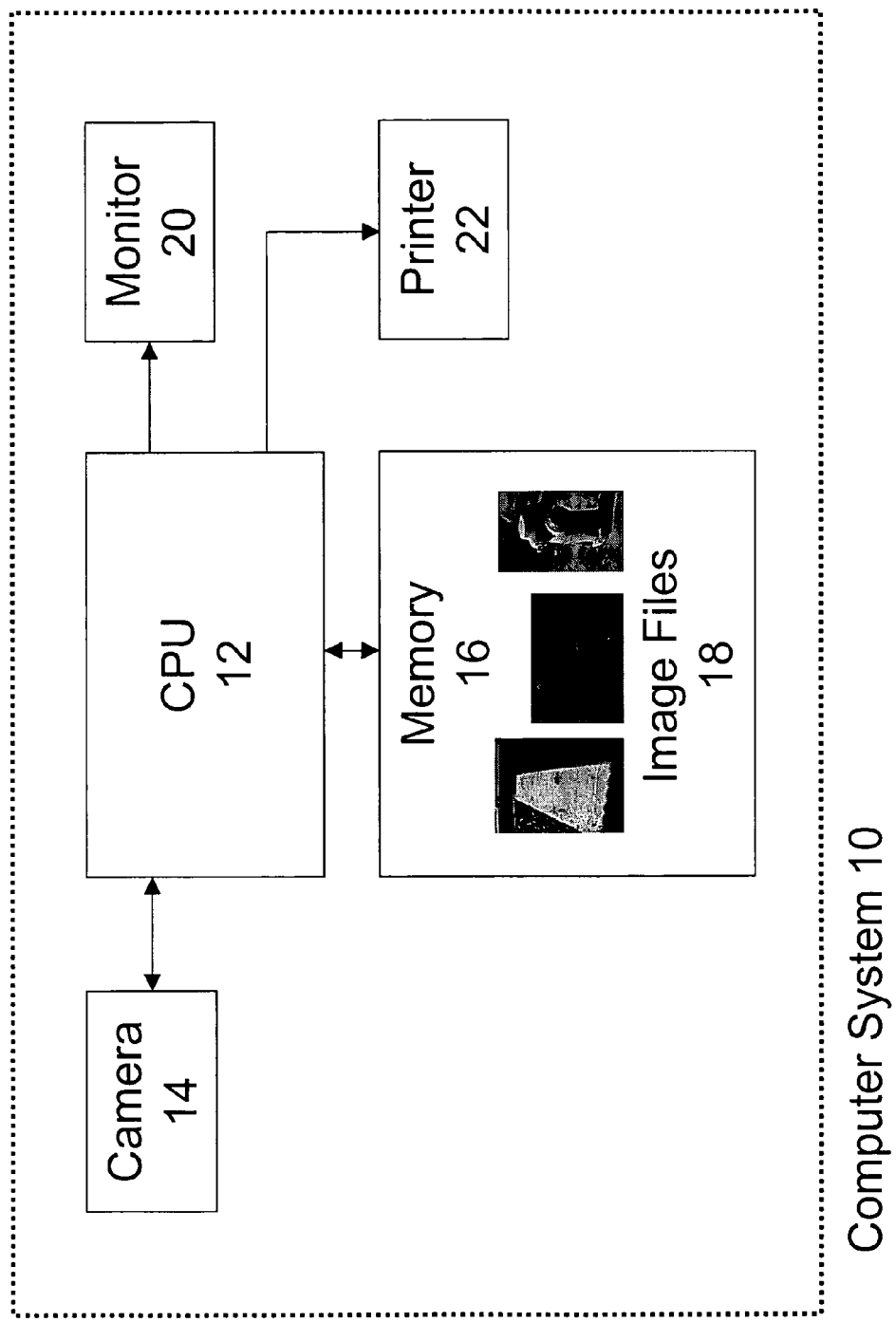
Figure 1: Computer System Configured to Operate on Images

| P(1, 1) | P(1, 2) | ... | P(1, M) |
|---------|---------|-----|---------|
| P(2, 1) | P(2, 2) | | |
| P(3, 1) | P(3, 2) | | |
| ... | | | ... |
| P(N, 1) | ... | ... | P(N, M) |

Image File 18

Figure 2: Pixel Array for Storing Image Data

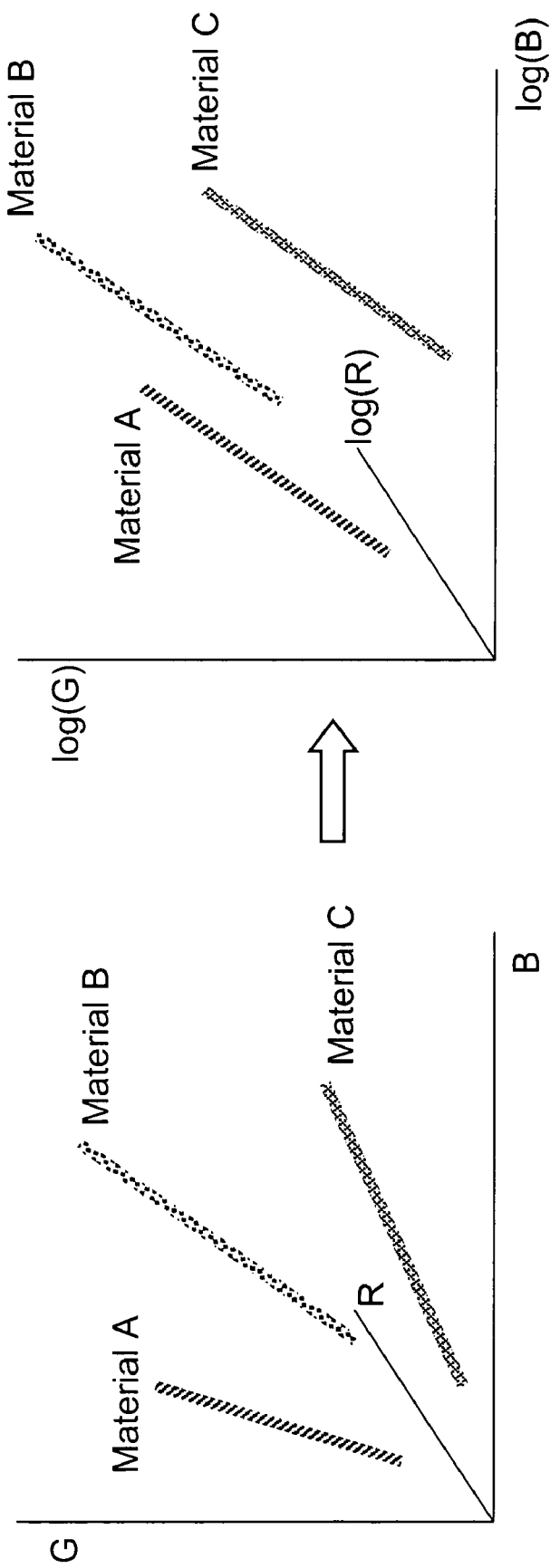
Figure 3: Log Color Space

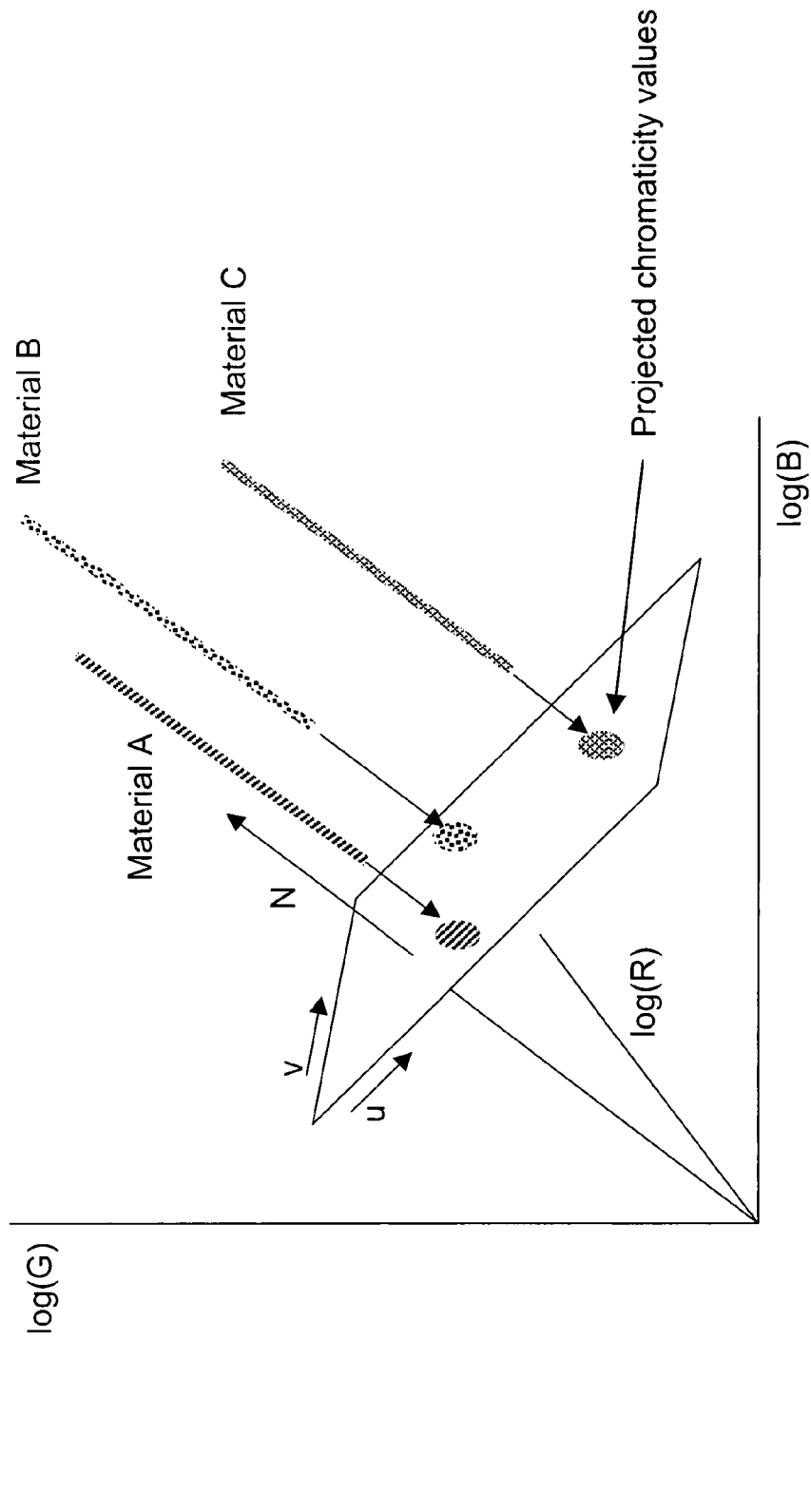

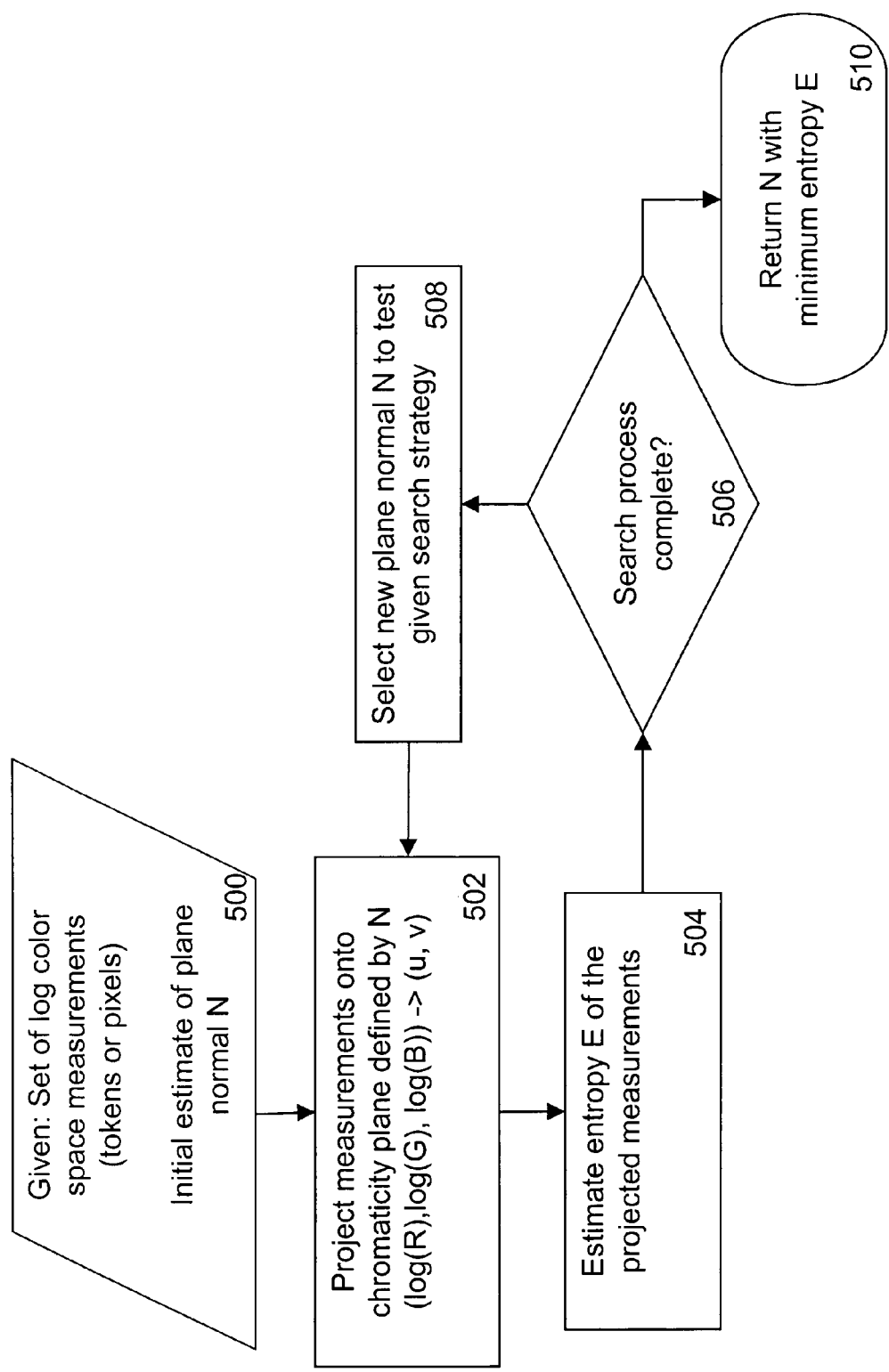
Figure 5a: Chromaticity Plane Estimation

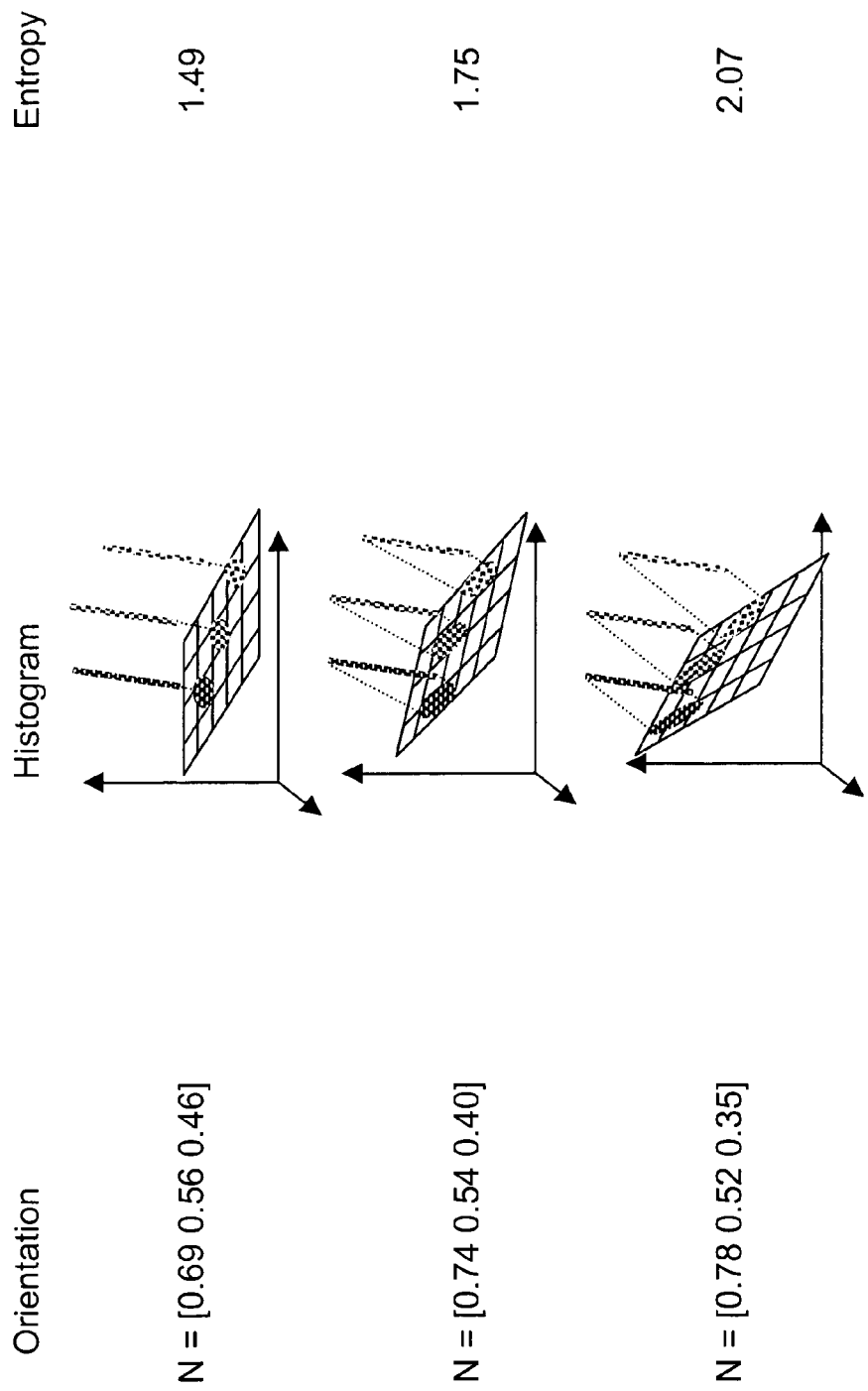
Figure 5b: Chromaticity Plane Estimation

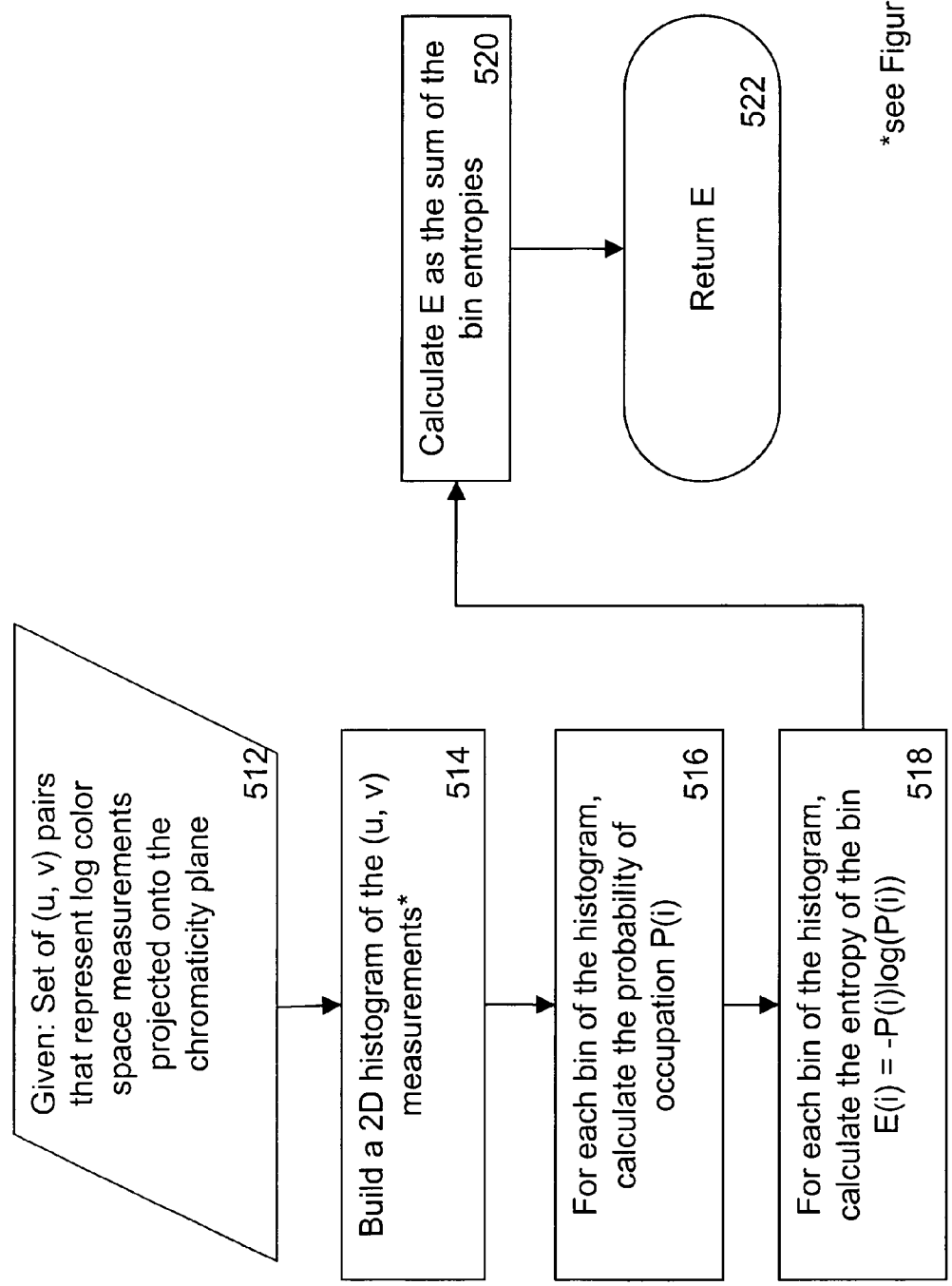
Figure 6: Histogram-based Entropy Estimation

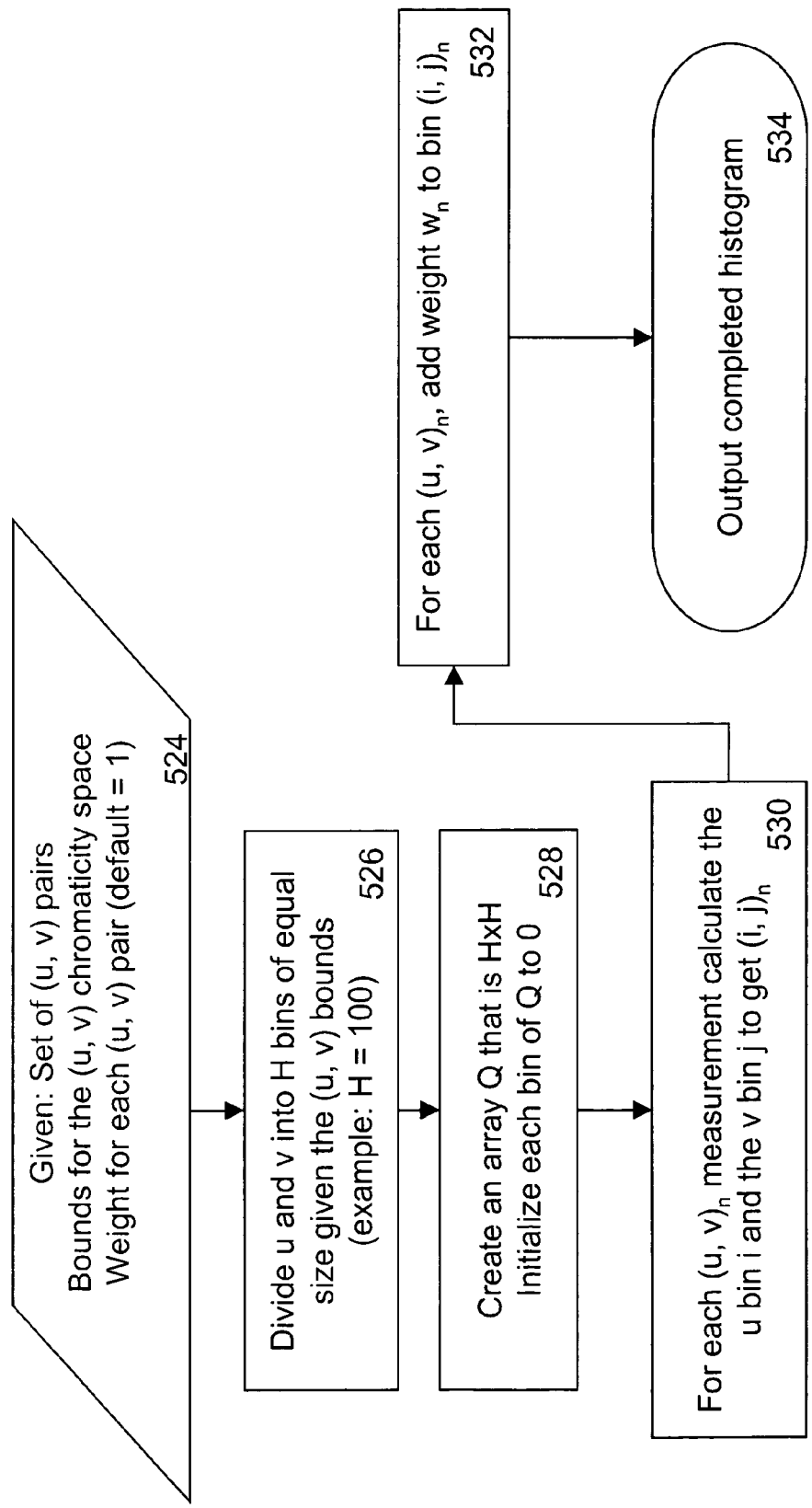
Figure 7: Method for Creating a (u, v) Chromaticity Histogram

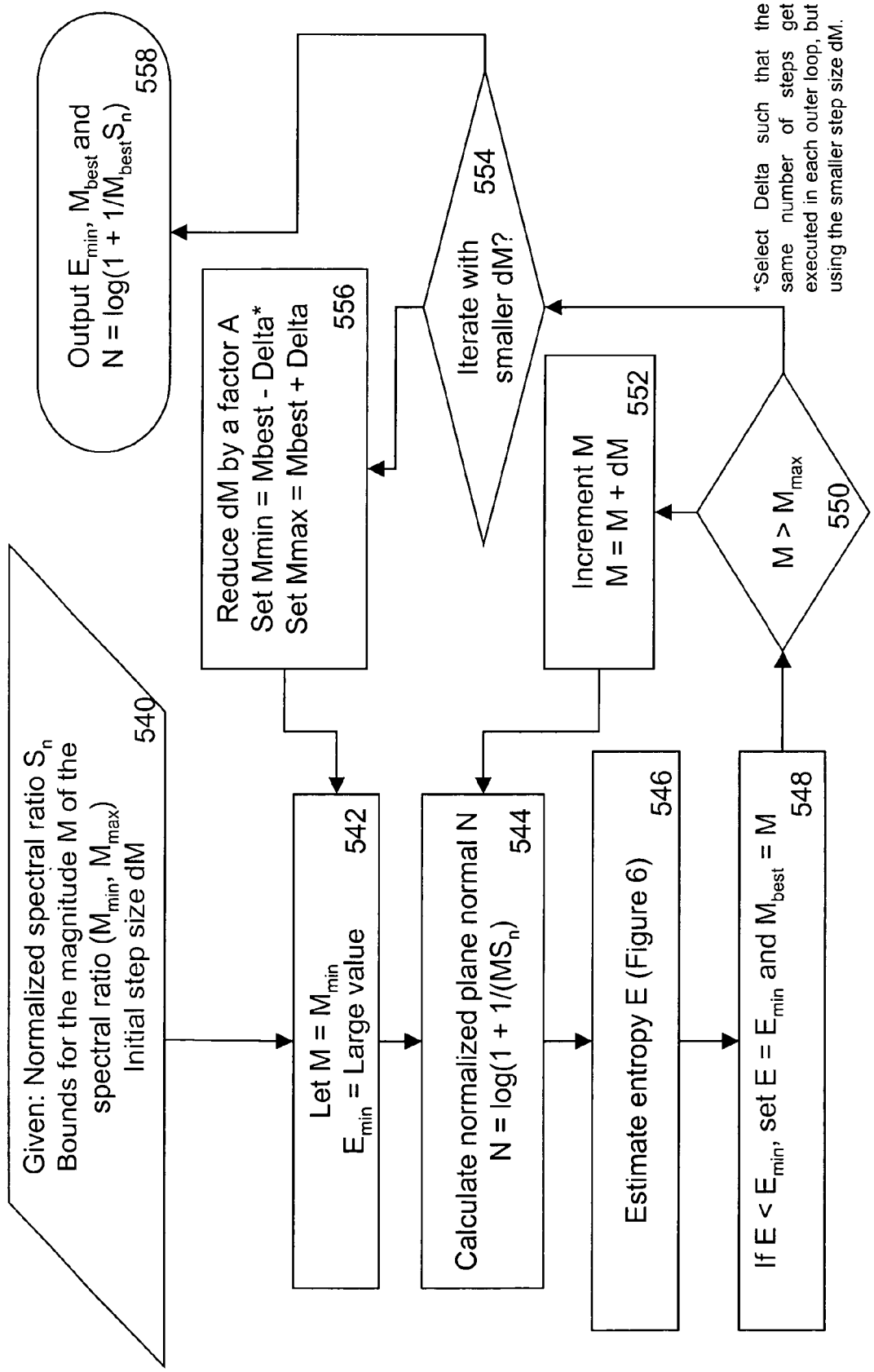
Figure 8: Constrained Search Method for Selecting N

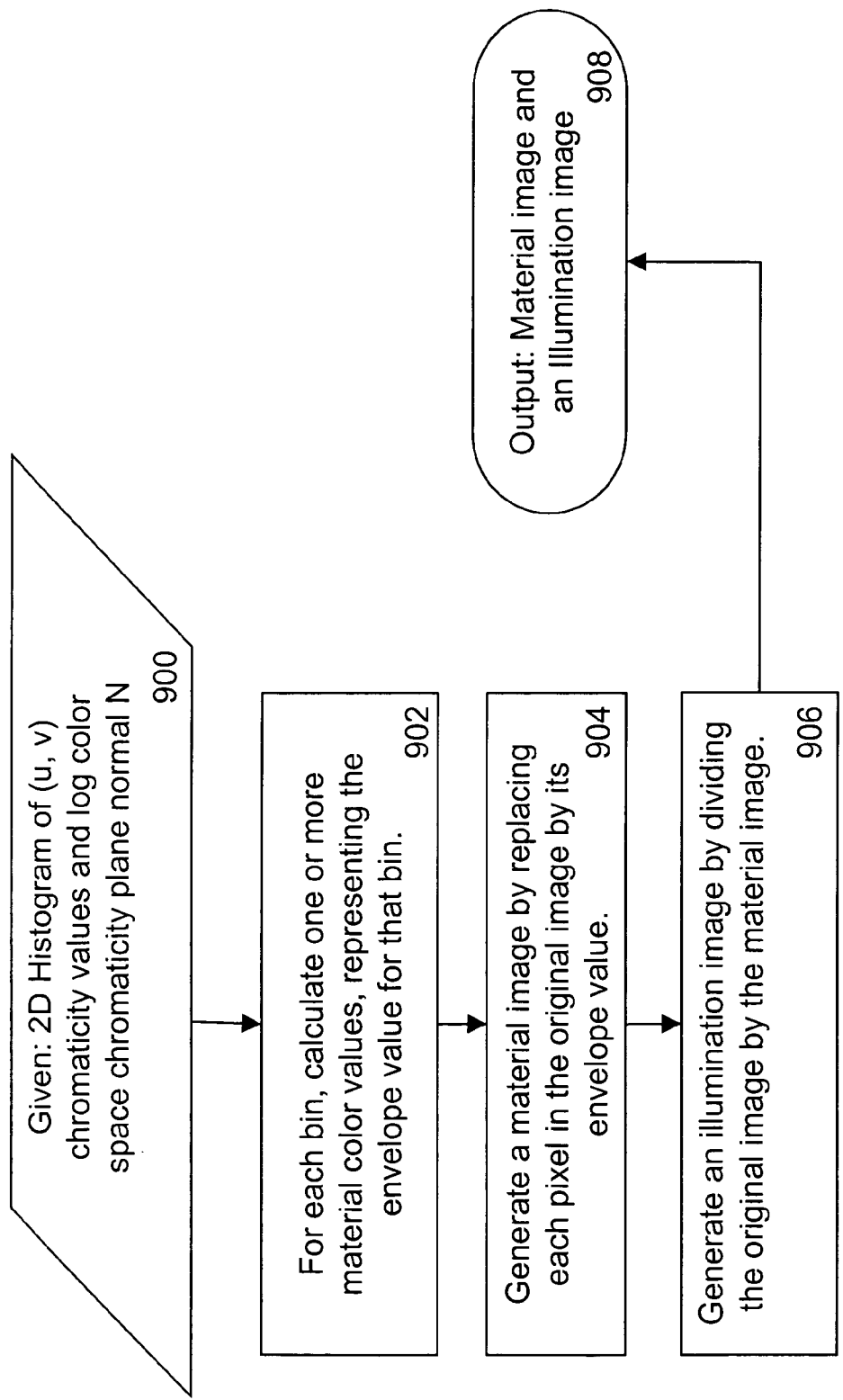
Figure 9: Separating Illumination and Reflectance

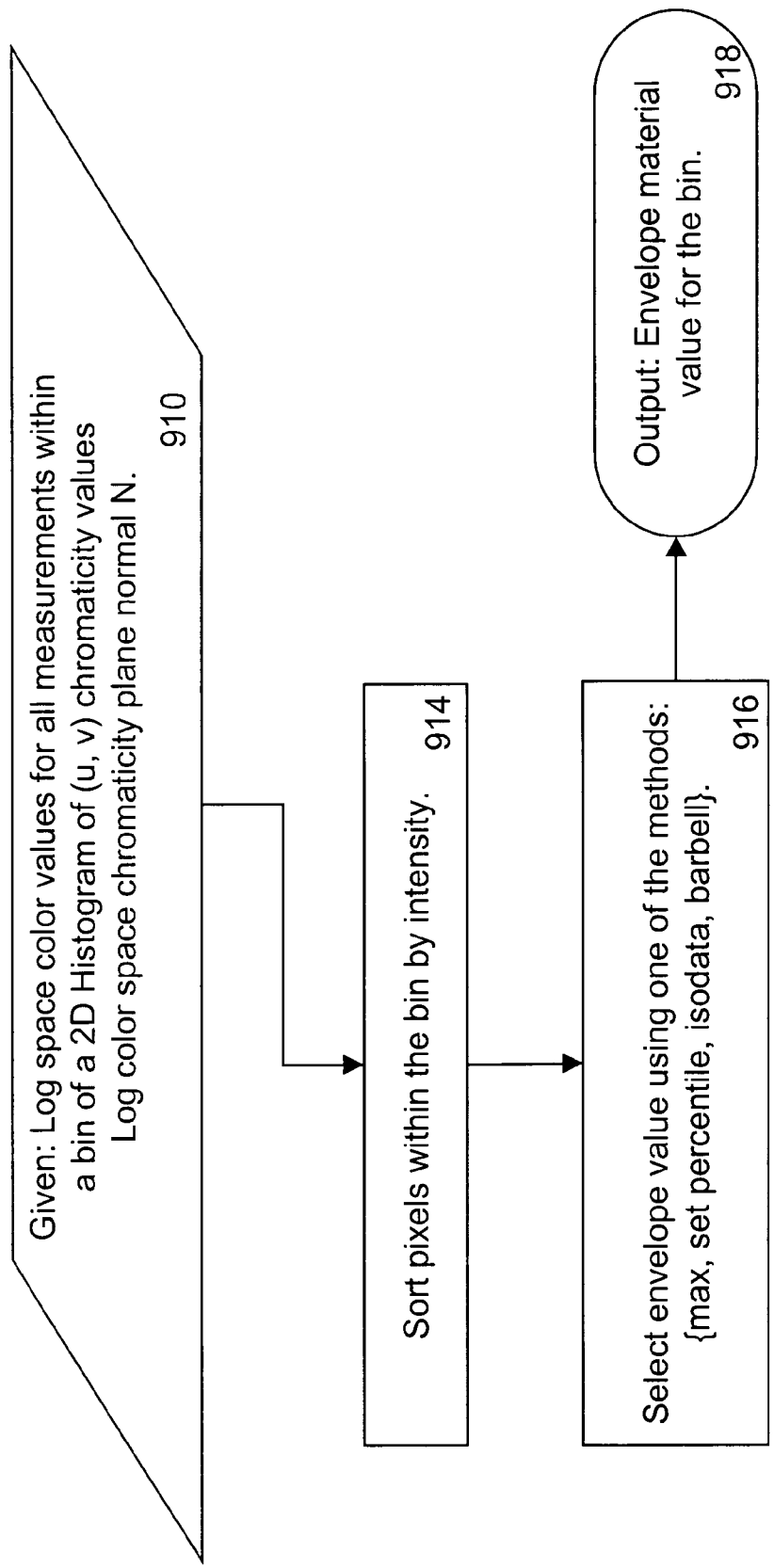
Figure 10: Calculating the Max Envelope Value

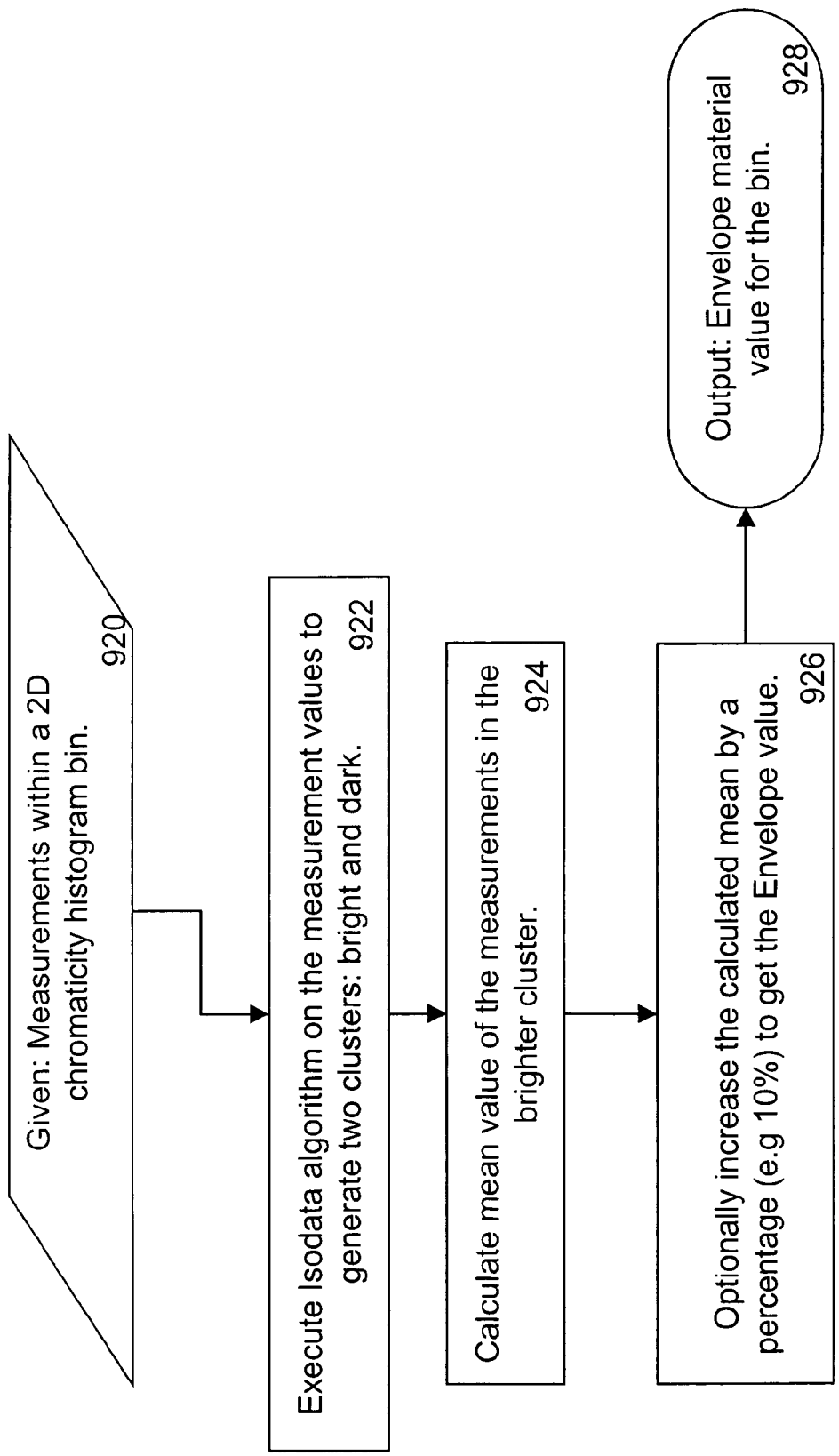
Figure 11: Calculating the Max Envelope Value Using Isodata

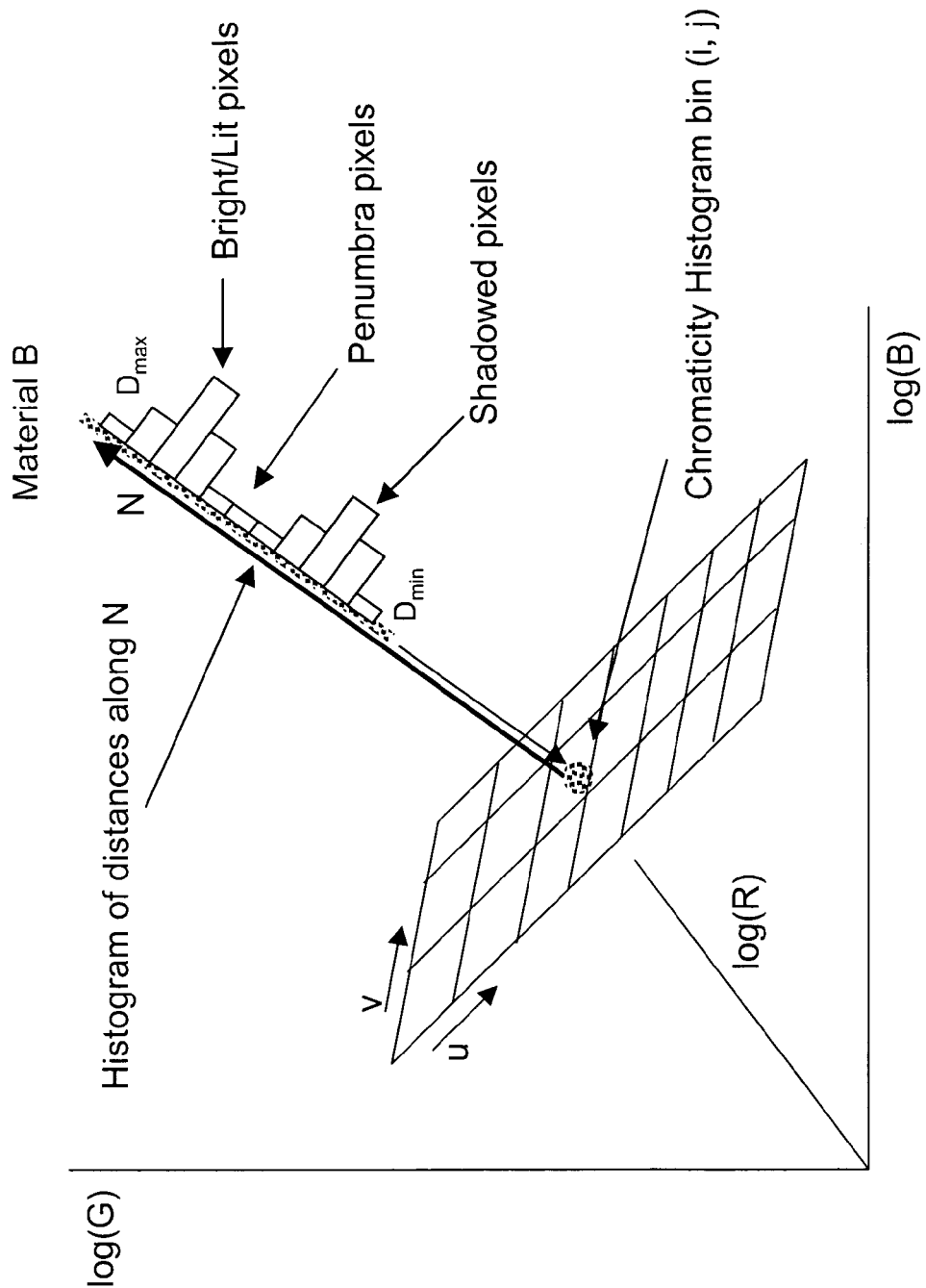
Figure 12: Barbell Concept in Log Color Space

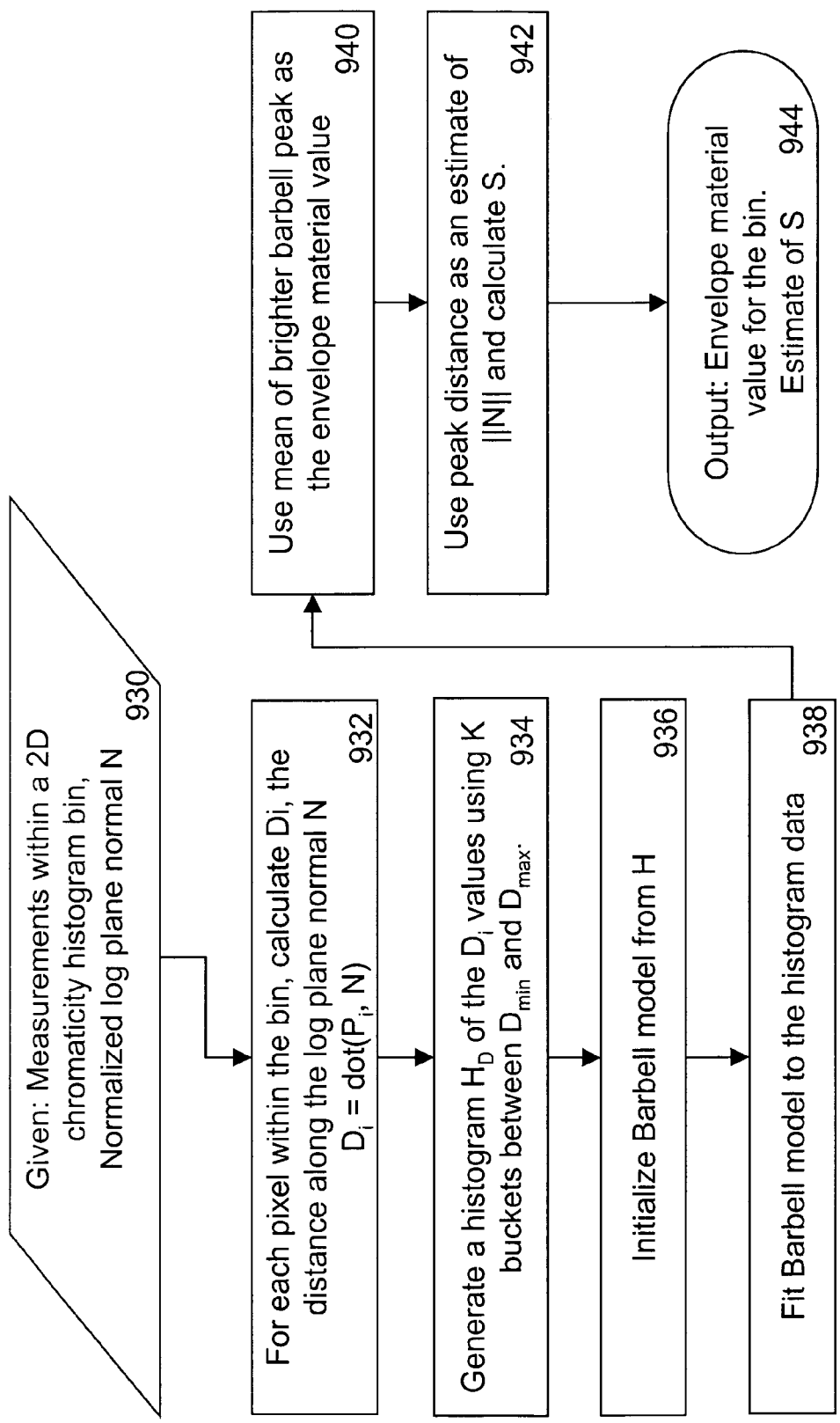
Figure 13: Calculating the Max Envelope Value Using Barbell Model

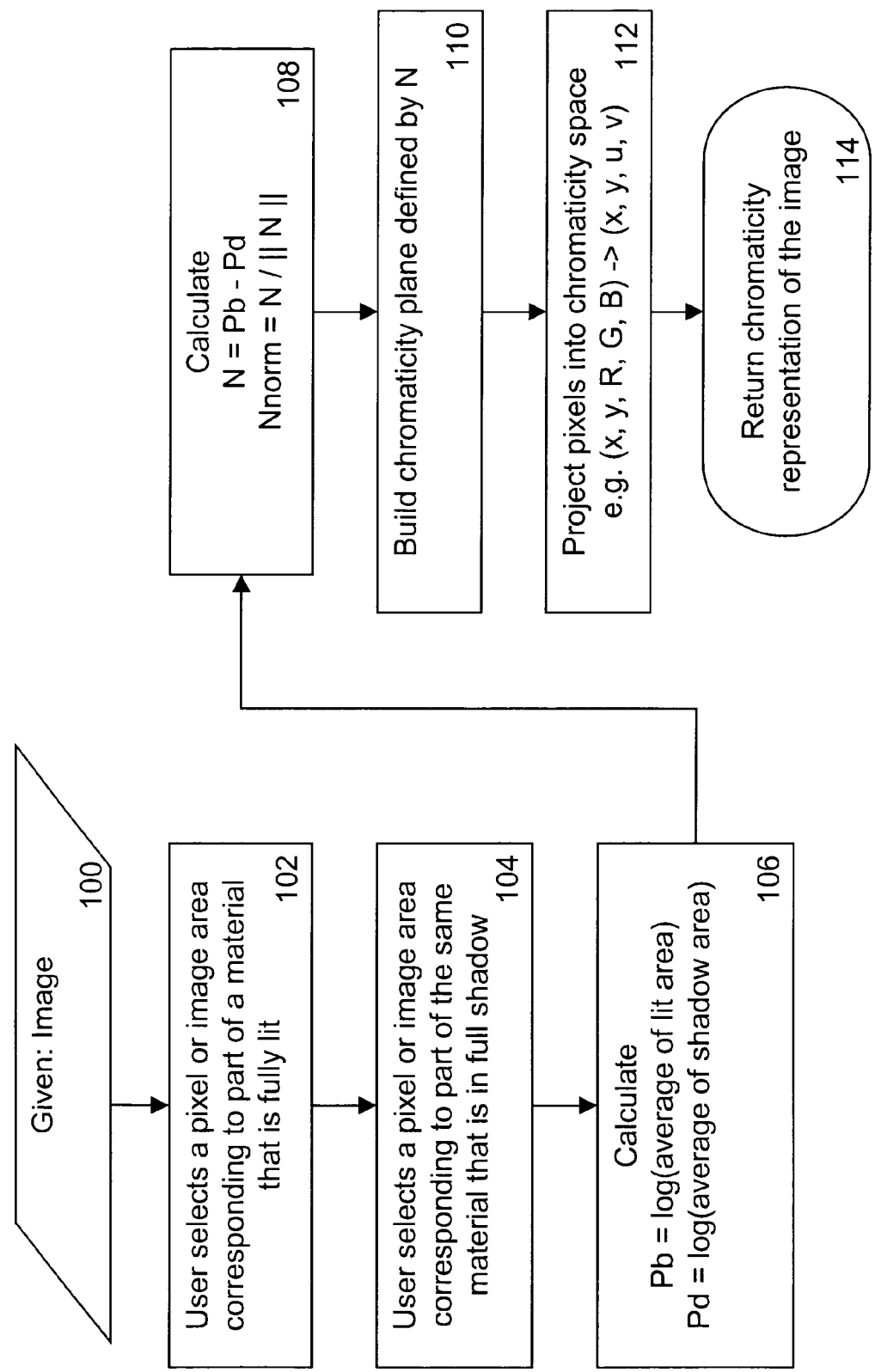
Figure 14: Manually creating an illumination invariant chromaticity plane

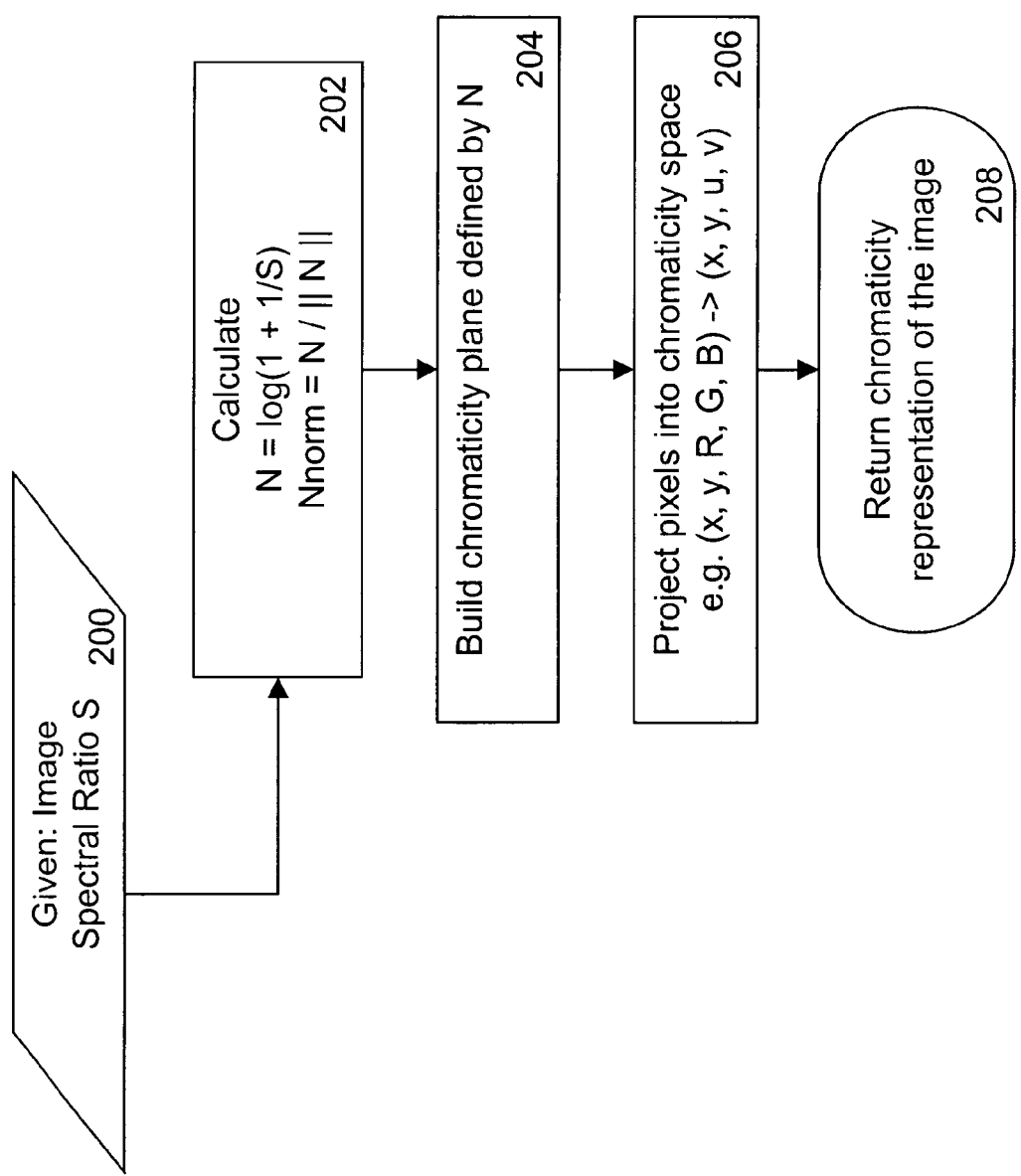
Figure 15: Creating an chromaticity plane from a spectral ratio

METHOD AND SYSTEM FOR SEPARATING ILLUMINATION AND REFLECTANCE USING A LOG COLOR SPACE

BACKGROUND OF THE INVENTION

A log color space is a representation of color values of an image in terms of logarithmic (log) values. Each color value of interest, n, is transformed to its logarithmic value, log(n). Log functions encompass mathematical properties that are useful in image analysis. For example, the log(n)<n for all values of n, and log(n)>log(m) whenever n>m. Of great use in image analysis, in logarithmic mathematics, multiplication and division are replaced by addition and subtraction: log(m*n)=log(m)+log(n) and log(m/n)=log(m)−log(n). Images are the result of illumination interacting with and reflecting from physical materials. The illumination reflections are captured by, for example, an optical system sensor. The image captured by the sensor conflates the contributions of the material and the illumination. Moreover, the illumination impinging on the sensor includes a wide dynamic range that varies from shadowed dark surfaces to shiny bright surfaces. Log transforms of color values simplify image analysis through the simplified mathematical properties of log functions, and, the use of log transforms has been considered in research directed to image analysis processes.

Chromaticity is a color representation of an image that ignores the intensity levels of the color values of the image. Thus, a chromaticity representation of an image is illumination invariant, that is each "color" of the chromaticity representation is independent of illumination. Such a representation is useful in computer vision applications. For example, in a robot designed to travel along a path identified by its color, expressed by the red, green and blue components of the color (R, G, B color values) of the path, the robot will view a shadow on the path (which will exhibit different R, G, B intensities and values) as something other than the path. In an accurate chromaticity representation, the color properties of the path are invariant from full illumination to full shadow. Thus, the robot is able to operate by correctly identifying the path regardless of the presence of shadows. Another application would be in finding a match between a sample image and any similar images within an image library. Illumination invariant versions of images facilitate the matching process by reducing variability caused by differences in illumination among images of similar material objects.

In one known chromaticity representation of an image, each R, G, B value is replaced by a normalized r, g value, where r=R/(R+G+B) and g=G/(R+G+B). In recent research efforts, the use of a log transform has been considered in connection with a chromaticity representation of an image. In one such proposed log color space, chromaticity values, r, g are explained in terms of logarithmic chromaticity values a, b, where a=log(R/G) and b=log(B/G). It is further explained that the log of the chromaticity values for a material under Planckian illuminants are approximately linear in the log chromaticity space, and each material line depicted in the chromaticity space will have the same slope. Each material line can be projected to a point on a line perpendicular to the slope of the material lines. The distance of each projected point along the perpendicular line is a grayscale value that can be used to generate a grayscale image without any shadows.

However, the known log transformation of the chromaticity values is used to generate representations that are invariant to Planckian illuminants. A Planckian illuminant is an illuminant that is generated according to Planck's law for blackbody radiation. As a material is heated, it will glow, and the color radiated changes from red to blue, to ultraviolet, and so on as the temperature of the material rises. Planckian illuminants form a set of colors that correspond to different temperatures. However, the set of colors is limited, and the prior log color space chromaticity proposal only approximates a truly illuminant invariant representation of an image.

SUMMARY OF THE INVENTION

The present invention provides a chromaticity representation of an image that is illumination invariant.

In a first exemplary embodiment of the present invention, an automated, computerized method for generating an illumination invariant, chromaticity representation of an image is provided. The method of the present invention comprises the steps of providing an image comprising an array of pixels, each pixel having N band color values, transforming the N bands to log color space values in a log color space, generating a bi-illuminant chromaticity plane in the log color space and projecting the log color space values to the chromaticity plane to provide chromaticity representation values corresponding to the pixels of the image.

In a second exemplary embodiment of the present invention, an automated computerized method for generating an illumination invariant, material image is provided. The method of the present invention comprises the steps of providing an original image comprising an array of pixels, each pixel having N band color values, generating a histogram of a bi-illuminant chromaticity plane, the histogram being divided into bins, calculating an envelope value for each bin of the histogram, co-relating each of the pixels of the original image to a corresponding bin of the histogram, and mapping the N band color values of each pixel to the envelope value of the co-related bin to provide the material image.

In a third exemplary embodiment of the present invention, a computer system comprises a CPU and a memory storing an image file defining an image comprising an array of pixels, each pixel having N band color values. Pursuant to a feature of the present invention, the CPU is arranged and configured to execute a routine: to transform the N bands to log color space values in a log color space, to generate a bi-illuminant chromaticity plane in the log color space and to project the log color space values to the chromaticity plane to provide chromaticity representation values corresponding to the pixels of the image.

In a fourth exemplary embodiment of the present invention, a computer system comprises a CPU and a memory storing an image file defining an image comprising an array of pixels, each pixel having N band color values. Pursuant to a feature of the present invention, the CPU is arranged and-configured to execute a routine: to generate a histogram on a bi-illuminant chromaticity plane, the histogram being divided into bins, to calculate an envelope value for each bin of the histogram, to co-relate each of the pixels of the original image to a corresponding bin of the histogram and to map the N band color values of each pixel to the envelope value of the co-related bin to provide the material image.

In accordance with yet further embodiments of the present invention, computer systems are provided, which include one or more computers configured (e.g., programmed) to perform the methods described above. In accordance with other embodiments of the present invention, computer readable media are provided which have stored thereon computer executable process steps operable to control a computer(s) to implement the embodiments described above. The automated, computerized methods can be performed by a digital computer, analog computer, optical sensor, state machine, sequencer or any device or apparatus that can be designed or programed to carry out the steps of the methods of the present invention.

BRIEF DESCRIPTION OF THE DRAWINGS

FIG. 1 is a block diagram of a computer system arranged and configured to perform operations related to images.

FIG. 2 shows an n×m pixel array image file for an image stored in the computer system of FIG. 1.

FIG. 3 is a graphic representation of a log color space.

FIG. 4 is a graphic representation of a log color space chromaticity plane according to a feature of the present invention.

FIG. 5a is a flow chart for performing a chromaticity plane estimation according to a feature of the present invention.

FIG. 5b is a chart illustrating entropy minimization according to execution of the chromaticity plane estimation of FIG. 5a.

FIG. 6 is a flow chart for performing a histogram-based entropy estimation according to a feature of the present invention.

FIG. 7 is a flow chart illustrating a method for creating a chromaticity histogram according to a feature of the present invention.

FIG. 8 is a flow chart illustrating a constrained search method according to a feature of the present invention.

FIG. 9 is a flow chart for separating illumination from reflectance, according to a feature of the present invention.

FIG. 10 is a flow chart for calculating a max envelope value, according to a feature of the present invention.

FIG. 11 is a flow chart for calculating a max envelope value using isodata, according to a feature of the present invention.

FIG. 12 is a graph illustrating a barbell concept in log color space, according to a feature of the present invention.

FIG. 13 is a flow chart for calculating a max envelope value using a barbell model, according to a feature of the present invention.

FIG. 14 is a flow chart for creating an illumination invariant chromaticity plane with a manual input by a user, according to a feature of the present invention.

FIG. 15 is a flow chart for creating an illumination invariant chromaticity plane using a spectral ratio, according to a feature of the present invention.

DETAILED DESCRIPTION OF THE PREFERRED EMBODIMENTS

Referring now to the drawings, and initially to FIG. 1, there is shown a block diagram of a computer system 10 arranged and configured to perform operations related to images. A CPU 12 is coupled to a device such as, for example, a digital camera 14 via, for example, a USB port. The digital camera 14 operates to download images stored locally on the camera 14, to the CPU 12. The CPU 12 stores the downloaded images in a memory 16 as image files 18. The image files 18 can be accessed by the CPU 12 for display on a monitor 20, or for print out on a printer 22.

Alternatively, the CPU 12 can be implemented as a microprocessor embedded in a device such as, for example, the digital camera 14 or a robot. The CPU 12 can also be equipped with a real time operating system for real time operations relating to images, for example, in connection with a robotic operation or an interactive operation with a user.

As shown in FIG. 2, each image file 18 comprises an n×m pixel array. Each pixel, p, is a picture element corresponding to a discrete portion of the overall image. All of the pixels together define the image represented by the image file 18. Each pixel comprises a digital value corresponding to a set of N color bands, for example, red, green and blue color components (RGB) of the picture element. The present invention is applicable to any multi-band image, where each band corresponds to a piece of the electromagnetic spectrum. The pixel array includes m columns of n rows each, starting with the pixel p (1,1) and ending with the pixel p(n, m). When displaying or printing an image, the CPU 12 retrieves the corresponding image file 18 from the memory 16, and operates the monitor 20 or printer 22, as the case may be, as a function of the digital values of the pixels (p(n, m, RGB)) in the image file 18, as is generally known.

In an image operation, the CPU 12 operates to analyze the RGB values of the pixels of a stored image file 18 to achieve various objectives, such as, for example, manipulation of the image to modify a shadow or to make a color correct brightness adjustment or a illumination invariant version of an image for use in a machine vision application, such as in a robot.

Pursuant to a feature of the present invention, a chromaticity representation of an image is generated in a manner that accommodates the fact that a material in shadow interacts with an illumination flux that is different from the illumination flux impinging upon a lit area of the material. Most scenes depicted in an image file 18 interacted with an illumination flux having two illuminants, including a direct or incident illuminant and an ambient illuminant. The incident illuminant causes shadows. It is the ambient illuminant that is present within a shadow. The spectrum for the incident illuminant and the spectrum for the ambient illuminant are often different from one another.

Thus, according to a feature of the present invention, a useful characterization of the appearance of materials under two illuminants in a log color space is derived from a bi-illuminant dichromatic reflection model (BIDR) of the image. The BIDR model indicates the appearance of a material surface that interacts with an illumination flux comprising an incident illuminant and an ambient illuminant having different spectra. The BIDR model predicts that the color of a specific material surface is different in shadow than the color of that same surface when partially or fully lit, due to the differing spectra of the incident illuminant and the ambient illuminant. The BIDR model also predicts that the appearance of a single-color surface under all combinations of the two illuminants (from fully lit to full shadow) is represented by a line in a linear color space, such as, for example, an RGB color space, that is unique for the specific material and the illuminant combination interacting with the material, as clearly illustrated by the line representations of Material A, Material B and Material C depicted in an image file 18, in the RGB graph of FIG. 3. As shown in the RGB graph of FIG. 3, none of the material line representations (A, B, C) intersect with the origin of the color space. This illustrates how in a color correct transition for a material, from shadow to lit, the linear representations do not necessarily (and most often do not) intersect the origin of the color space. Each line (A, B, C) extends from a lower end (full shadow) to an upper end (fully lit).

In a simplified version, the BIDR model can be stated as: $I_{(x, y, z, \lambda)} = C_b(\lambda) D(\lambda) \gamma_b + C_b(\lambda) A(\lambda)$, where $I_{(x, y, z, \lambda)}$ is the radiance of the surface depicted in the image at point (x, y, z) for the wavelength $\lambda$, $c_b(\lambda)$ is the body reflection (material) intensity at the wavelength $\lambda$, $D(\lambda)$ is the direct or incident illuminant intensity at the wavelength $\lambda$, $\gamma_b$ is the fraction of direct illuminant visible at the point (x, y, z) with $\gamma_b=1$ corresponding to a fully lit value (Bright) and $\gamma_b=0$ corresponding to a full shadow (Dark), and A (λ) is the ambient illumination intensity at the wavelength λ. The BIDR model is an accurate depiction of color variation due to the interplay of the incident illuminant and the ambient illuminant on a material, from shadow to fully lit. For a more detailed description of the BIDR model, reference should be made to co-pending application Ser. No. 11/341,751, filed Jan. 27, 2006, entitled: "Bi-illuminant Dichromatic Reflection Model For Image Manipulation," now published as US 2007/0176940 on Aug. 2, 2007, which is hereby incorporated by reference.

Each of the values of the BIDR model can be represented by a N-element vector, where N is the number of color bands used to represent an image. For example, in a typical digital camera, an image is depicted in three color bands, the wavelengths λ at each of red, green and blue (RGB). In the BIDR model of the image, a Dark RGB vector ($Dark_{vector}$) equals $c_b A$, and a Bright RGB vector ($Bright_{vector}$) equals $c_b D + c_b A$. In a log color space, the $\log(I_{(x,y,z)}(R, G, B)) = [\log(R) \log(G) \log(B)]$ for N=3 in an RGB space.

A method for representing a range of color change for a material from a fully lit appearance ($\gamma_b = 1$) through the penumbra of a shadow to a full shadow appearance ($\gamma_b = 0$), expressed as a three element RGB vector, is through the use of a spectral ratio, $S_{vector} = Dark_{vector}/(Bright_{vector} - Dark_{vector})$. A BIDR model expression of a log transform of a vector of the radiance of a material surface, $I_{vector}(x, y, z,)$, in terms of the spectral ratio can be stated as: $\log(I_{vector}(x, y, z,)) = \log(c_{bvector}) + \log(A_{vector}) + \log(1 + K \gamma_b/S_{norm})$, where $S_{norm}$ is the normalized spectral ratio, $S_{norm} = S_{vector} K$, and $K = 1/\|S_{vector}\|$. The mathematical significance of the $\log(I_{vector}(x, y, z,))$ equation is that the first two terms of the equation are constant for a particular surface. And while the third term is variable, the term is not dependent upon the color of either the illuminant or the surface material. Only the ratio of the two illuminants (the spectral ratio), and the percent of direct illuminant ($\gamma_b$) cause changes in the third term. Thus, curves in a log color space based upon the BIDR model, that represent any surface under the same direct/ambient illuminant pair, form shifted versions of one another, relative to the co-ordinates of the log color space. Moreover, the difference between a fully lit and fully shadowed pixel, and therefore the vector connecting them in the log color space, will be identical for all surfaces. The shape of the curves in the log color space is determined by the normalized spectral ratio of the image. For a neutral or unsaturated spectral ratio, the curves approach straight lines in the log color space, as shown in the log color graph of FIG. 3.

A neutral spectral ratio is a spectral ratio with equal values in all color channels, e.g. S=(1, 1, 1). In that situation, the ambient illuminant has the same spectral composition as the direct or incident illuminant. A very saturated spectral ratio would be one with a large difference between the maximum and minimum value, e.g. S=(1, 0.6, 0.2). An unsaturated spectral ratio is one that is closer to the first case than the second. Saturation is defined as:

Saturation=1−(min/max), so the saturation of the first case is zero (min=max). The saturation of the second case would be:

Sat2=1.0−(0.2/1.0)=0.8

Real examples of saturations around 0.85 occur usually late in the afternoon as the sun is setting with a clear blue sky. Typical spectral ratios are more like 0.3 to 0.6. So a ratio S=(0.4, 0.55, 0.7) with a saturation of 0.43 would be common for a sunny day with a clear sky. A very unsaturated spectral ratio would be like S=(0.5, 0.57, 0.6), which would have a saturation of 0.17.

According to a feature of the present invention, the BFDR model material lines, for example, the Material A, B, C lines depicted in the RGB graph of FIG. 3, when transformed to log values, are depicted as corresponding log values in the log(R), log(G), log(B) graph of FIG. 3. As a result of the mathematical properties of logarithmic values discussed above, the log transforms of the material lines A, B, C form parallel lines, when, as noted above, the image has a neutral or unsaturated spectral ratio, as clearly shown in the log graph of FIG. 3. Because of the mathematical properties of the $\log(I_{vector}(x, y, z,))$ equation, it is possible to find a bi-illuminant chromaticity plane in the log color space, when properly aligned, as will be described below, where all of the fully lit (Bright) and fully shadowed (Dark) pixels of a given material surface of an image file 18 project on top of one another, even for very saturated spectral ratios, producing a two dimensional chromaticity co-ordinate for the material surface that is illumination invariant. Moreover for most practical spectral ratios, i.e., spectral ratios with saturation<0.85, all of the pixels within the penumbra portion of the log color space line representation, project close to the fully lit and fully shadowed pixels on a properly aligned chromaticity plane.

FIG. 4 is a graphic representation of a log color space, bi-illuminant chromaticity plane according to a feature of the present invention. The alignment of the chromaticity plane is determined by the vector N, normal to the chromaticity plane, and defined as $N = \log(Bright_{vector}) - \log(Dark_{vector}) = \log(1 + 1/S_{vector})$. The co-ordinates of the plane, u, v can be defined by a projection of the green axis onto the chromaticity plane as the u axis, and the cross product of u and N being defined as the v axis. In our example, each log value for the materials A, B, C is projected onto the chromaticity plane, and will therefore have a corresponding u, v co-ordinate value in the plane that is a chromaticity value, as shown in FIG. 4. Thus, the RGB values of each pixel in an image file 18 can be mapped by the CPU 12 from the image file value p(n, m, R, G, B) to a log value, then, through a projection to the chromaticity plane, to the corresponding u, v value, as shown in FIG. 4. Each pixel p(n, m, R, G, B) in the image file 18 is then replaced by the CPU 12 by a two dimensional chromaticity value: p(n, m, u, v), to provide a chromaticity representation of the original RGB image. In general, for an N band image, the N color values are replaced by N−1 chromaticity values. The chromaticity representation is a truly accurate illumination invariant representation because the BIDR model upon which the representation is based, accurately and correctly represents the illumination flux that caused the original image.

According to the present invention, a chromaticity plane alignment estimation can be implemented using any one of several techniques. For example, the CPU 12 can determine estimates based upon entropy minimization (FIG. 5a), manual selection by a user (FIG. 14) or the use of a characteristic spectral ratio for an image (FIG. 15).

Referring now to FIG. 5a, there is shown a flow chart for performing a chromaticity plane alignment estimation according to a feature of the present invention. The estimation of a proper or optimal alignment for the chromaticity plane, as shown, for example in FIG. 4, is carried out by utilizing an entropy minimization technique. Entropy is a measure of order in a physical system. Entropy is inversely proportional to order, the lower the entropy, the higher the order of the system under review. At an optimal orientation for the chromaticity plane, all Bright and Dark pairs for a single material depicted in an image file 18, should project to the same point on the chromaticity plane, a high order, or low entropy state. The entropy of the projection of points onto the plane is a measure of how well the pairs line up for all materials in the image file 18. The lower the entropy, the higher the order of the chromaticity plane, and, thus, the more accurate the projections of Bright/Dark pairs.

In the routine of FIG. 5a, the CPU 12 operates to search for a low entropy state for the chromaticity plane illustrated in FIG. 4. FIG. 5b shows an example of search results. At each orientation selected for the plane, a histogram for the chromaticity plane shows the distribution of log color space projections among a grid of bins. The wider the distribution across the plane of the histogram, the higher the entropy. The generation of the histogram will be described below, in the description of FIG. 7. The CPU 12 can implement a known search technique to select a series of orientations for the chromaticity plane, and thereafter, select the orientation for the plane having the lowest entropy. Such known search techniques include, for example, exhaustive search, univariate search, and simulated annealing search methods described in the literature. For example, the univariate search technique is described in Hooke & Jeeves, "Direct Search Solution of Numerical and Statistical Problems," Journal of the ACM, Vol. 8, pp 212-229, April, 1961. A paper describing simulated annealing is Kirkpatrick, Gelatt, and Vecchi, "Optimization by Simulated Annealing," Science 220 (1983) 671-680. Various other search techniques are described in Reeves, ed., Modem Heuristic Techniques for Combinatorial Problems, Wiley (1993).

An example of an exhaustive search can be described as: If you have two dimensions to search (like x, y), you set bounds on x, set bounds on y, and then execute the following algorithm:
Emin=large value
XYbest=Null value
for x=xmin to xmax step by dx
for y=ymin to ymax step by dy
calculate Entropy Etmp given (x, y)
If Etmp is less than Emin
Emin=Etmp
XYbest=(x, y)
end for (y)
end for (x)
Emin is the minimum entropy
XYbest is the alignment of the plane normal at the minimum entropy location A variation on the algorithm will then reduce xmin to Xbest−Delta and xmax to Xbest+Delta, and reduce ymin to Ybest−Delta and ymax to Ybest+Delta and re-run the above algorithm using a smaller dx and dy. Delta is generally set so that the same number of steps are searched on each run using the smaller dx and dy. The algorithm terminates after a certain number of iterations of reducing dx and dy, or when the minimum entropy Emin doesn't change using the smaller dx and dy. In the case of a chromaticity plane normal, u and v represent angles (pan and tilt). The search can be restricted to angles that give the plane normal all positive in log(R), log (G), and log(B).

In step 500, the CPU 12 starts with a set of log color space measurements, as for example, the log values depicted in the log space graph of FIG. 3. As described above, the log space graph was derived from RGB values of pixels p(n, m) from an image file 18, as shown in the RGB graph of FIG. 3. In lieu of individual pixel values, uniform tokens can be used to generate measurements in an RGB space graph. A uniform token is a homogeneous token that comprises a connected region of an image with approximately constant pixel values (for example, within a range determined by the expected noise margin of the recording equipment or normal variations in materials) throughout the region. A $1^{st}$ order uniform token comprises a single robust color measurement among contiguous pixels of the image. An automated method for identifying uniform tokens in an image is disclosed in co-pending application Ser. No. 11/341,742, filed on Jan. 27, 2006, entitled: "Method and System For Identifying Illumination Flux In An Image," now published as US 2006/0177149, on Aug. 10, 2006, which is hereby incorporated by reference. In the co-pending application, uniform tokens are identified through the use of seeds to find a core of contiguous pixels with similar color values. A good seed is then grown to identify the full extent of the uniform token.

When tokens are used, token based optimization is achieved by adhering to the following optional constraints:
1. Use only tokens with initial seed sizes greater than N (for example greater than 2) to avoid boundary tokens.
2. Weight tokens by seed size, for example, multiply the weight of the token in the optimization process by seed size.
3. Weight tokens by their overall size, so larger tokens get more weight, for example, multiply the weight of a token by the log of the size of the region defined by the uniform token.
4. Weight tokens that represent very bright or very dark regions of an image more heavily than tokens in the middle of an intensity range of the image, as a mechanism to provide Bright/Dark pairs that align on the chromaticity plane.

An initial estimate of the chromaticity plane normal, N, is also made by the CPU 12. The initial estimate can approximate an orientation parallel to the slope of any of the material representation lines in the log color space, as depicted in FIGS. 3 and 4. An initial estimate can be based, for example, upon a characteristic spectral ratio for the image, using the relationship between N and S:$N=\log(1+1/S_{vector})$. A characteristic spectral ratio for an image can be determined using any of the methods taught in the aforementioned co-pending application Ser. No. 11/341,742, filed on Jan. 27, 2006, entitled: "Method and System For Identifying Illumination Flux In An Image."

In step 502, the CPU 12 projects the log values of the pixels of the image, in our example Materials A, B, C of the log color space, onto the current chromaticity plane orientation, as defined by the selected N:(log(R), log(G), log(B))→(u, v). This provides a plurality, n, of (u, v) pairs corresponding to the plurality of log color values of the pixels of the image, on the chromaticity plane for the selected normal orientation, N. Each (u, v) pair of the n pairs provides a chromaticity value representation for a corresponding log color space value of a pixel of the image.

In step 504, the CPU 12 estimates the entropy E of the projection distribution of the $(u, v)_n$ pairs for the selected orientation of the chromaticity plane. FIG. 6 is a flow chart for performing a histogram-based entropy estimation according to a feature of the present invention. In step 512 of the flow chart of FIG. 6, the CPU 12 starts with the set of (u, v) pairs representing the log color space measurements projected onto the current chromaticity plane. In step 514, the CPU 12 builds a histogram of the (u, v) measurements. FIG. 5b illustrates exemplary histograms corresponding to a set of selected chromaticity plane orientations.

FIG. 7 is a flow chart illustrating a method for creating a chromaticity histogram according to a feature of the present invention. In step 524, the CPU 12 is input the set of (u, v) pairs, and sets bounds for the (u, v) chromaticity space to be depicted by the histogram. The bounds can be related to the range of RGB color values of the pixel array in the source image file 18. A weight is also assigned to correspond to each (u, v) pair corresponding to a projected log RGB value, for example, w=1.

In step 526, the histogram space is divided into H equal sized bins in each dimension of the chromaticity plane, for example, H=100 (see FIG. 5b). In step 528, the CPU 12 creates an array Q of H×H bins, and initializes each bin to 0. In step 530, the CPU 12 calculates the corresponding bin for each $(u, v)_n$ co-ordinate pair of the projected log RGB values in the current selected orientation of the chromaticity plane. Each bin H can be defined by co-ordinates i, j, that provide a unique $(i, j)_n$ designation for each bin H. The i co-ordinate is the location number of the bin H along the u axis, and the j co-ordinate is the location number of the bin H along the v axis of the corresponding chromaticity plane. Accordingly, for each $(u, v)_n$ pair, the CPU 12 determines the bin i for the u value of the current pair, and the bin j for the v value, resulting in the specific $(i, j)_n$ designation for the specific bin H where the current $(u, v)_n$ pair is located.

In step 532, the CPU 12 assigns a weight, $w_n$, to each bin H. The weight for the bin equals the sum of the weights of the total number $(u, v)_n$ pairs found in the corresponding bin by execution of step 530 by the CPU 12. In our example, the weight of each (u, v) pair is 1. In step 534, the CPU 12 outputs the histogram which comprises the bin array, with each bin, H being highlighted as a function of the weight of the bin and the location of the (u, v) pairs within the bin. Accordingly, the bins of the generated histogram show the distribution of log RGB values across the chromaticity plane.

Returning now to FIG. 6, the completion of the routine of FIG. 7 completes step 514 of FIG. 6. In step 516, for each bin of the histogram, the CPU 12 calculates the probability of occupation P(i). The probability of occupation of (u, v) measurements within a specific bin H is determined by the fraction of measurements within the bin ($(u, v)_n$ pairs in the bin $(i, j)_n$/ total (u, v) pairs in the current chromaticity plane). Thereafter, in step 518, the CPU 12 calculates the entropy for each bin H as a function of the probability of the bin, E(i)=−P(i) log(P(i)).

In step 520, the CPU 12 calculates the total entropy for the current selected orientation for the chromaticity plane: E=Σ₁−P(i)log(P(i). In step 522, the CPU 12 returns the E for the current orientation to complete step 504 of FIG. 5a. Returning to FIG. 5a, in decision block 506, the CPU 12 determines whether the search process is complete. As discussed above, the termination of the search for an optimum orientation for the chromaticity plane is set by the particular search algorithm utilized. If the search is not complete, the CPU 12 proceeds to step 508, and selects a new plane normal orientation, N, pursuant to the search strategy, and returns to step 502, to repeat the estimation process for the new selected orientation of the chromaticity plane. If the number of sample orientations dictated by the particular search algorithm has been reached, the CPU 12 continues to step 510 and returns the plane orientation with the lowest total entropy as the optimal orientation, and thus provides the optimal (u, v) values to be used as a chromaticity representation of the RGB values of the image file 18.

Referring now to FIG. 8, there is shown a flow chart illustrating a constrained search method for estimating the chromaticity plane normal, N, according to a feature of the present invention. In step 540, the CPU 12 receives as input a normalized spectral ratio for the Bright and Dark color values of an image depicted in an image file 18, $S_n$, having an hypothesized length, M, and minimum and maximum bounds ($M_{min}$, $M_{max}$) for the magnitude of M. For example, $M_{min}$=0.1, and $M_{max}$=1.0. M $S_n$ comprises an unnormalized hypothesized spectral ratio for the image. The CPU 12 also receives as an input an incremental value for the magnitude, dM, which, in our example, can be set at 0.01, to provide 90 incremental steps between an $M_{min}$=0.1 and an $M_{max}$=1.0.

In step 542, the CPU 12 lets M=$M_{min}$, and sets a minimum entropy value, $E_{min}$ equal to an arbitrarily large value. In step 544, the CPU 12 calculates a plane normal, N, for a first selected chromaticity plane for estimation of entropy, utilizing the algorithm: N=log(1+1/(M $S_n$)). The log RGB values derived from an image file 18 are projected to the selected chromaticity plane. In step 546, the CPU 12 estimates the entropy for the distribution of the projections for the current selected chromaticity plane normal, N, through execution of the routine illustrated in FIG. 6, as described above.

Upon completion of the entropy estimation routine, the CPU 12, in step 548, determines if the estimate for E<$E_{min}$. If E<$E_{min}$, the CPU 12 sets E=$E_{min}$ and $M_{best}$=M. The CPU 12 then proceeds to decision block 550, where the CPU 12 determines if M>$M_{max}$.

If M<$M_{max}$, the CPU 12 proceeds to step 552, to increment M:M=M+dM. Once the value of M has been incremented, the CPU 12 returns to repeat steps 544-548 to estimate entropy for a new selection for N, and then returns to step 550 to once again test for M>$M_{max}$.

If M>$M_{max}$, the CPU 12 proceeds to step 554. In step 554, the CPU 12 determines if a further iteration is to be executed with a smaller dM. The decision can be based upon, for example, how much Emin has changed since the last iteration through possible values of M.

If the decision is to proceed to iterate with a smaller dM, the CPU 12 proceeds to step 556. In step 556, the CPU 12 reduces dM by a factor A. In our example, dM was initially set at 0.01. A could be, for example, 0.1, reducing the original dM from 0.01 to 0.001. The CPU 12 also sets $M_{min}$=$M_{best}$−Delta, and $M_{max}$=$M_{best}$+Delta. In our example, Delta can be set at 0.045, and thus the search will continue from (0.4−0.045) to (0.4+ 0.45), or (0.355 to 0.445) with a dM of 0.001. The CPU 12 then repeats steps 542 to 550 for the new set of values.

If the decision is not to proceed to iterate with a smaller dM, the CPU 12 proceeds to step 558. In step 558, the CPU 12 outputs $E_{min}$, $M_{best}$, and N=log(1+1/($M_{best}$ Sn).

Referring now to FIG. 9, there is shown a flow chart for separating illumination from reflectance in an image using a chromaticity plane as estimated by the CPU 12, according to a feature of the present invention. In step 900, the CPU 12 receives as input a two dimensional histogram of (u, v) chromaticity values divided into bins, and a log color space chromaticity plane normal, N, as generated by the CPU 12 through execution of the routines of FIGS. 5-7 or FIG. 8. In step 902, the CPU 12 examines each bin H of the histogram to calculate an envelope value for each bin. An envelope value can be determined by the CPU 12 by utilizing any of the methods shown in FIGS. 10-11, and FIG. 13, as will be described below. For example, each bin contains a variety of pixel value projections, (u, v) pairs formed by the projections from the log color space (FIG. 5b). Within each bin, the (u, v) pairs correspond to pixels that vary in intensity, representing a variety of illumination conditions. The CPU 12 selects a "brightest" (as will be defined below) value from each bin as a max envelope representation of the bin. An envelope value determination yields a set of bright pixels, one from each bin, to provide a rough approximation of all fully lit colors in the original image.

Thereafter, in step 904, the CPU 12 generates a material image by replacing the RGB value of each pixel of an image file 18, by the corresponding envelope value. The RGB values of each pixel in an image file 18 can be mapped by the CPU 12 from the image file value p(n, m, R, G, B) to a log value, then, through a projection to the chromaticity plane, to the corresponding bin H (FIG. 5b). Each pixel p(n, m, R, G, B) in the image file 18 is then replaced by the CPU 12 by the envelope value for the bin containing the log color space value projection: p(n, m, Envelope value), to provide an all bright illumination material color version of the original image.

In step 906, the CPU 12 generates an illumination image by dividing the original image by the material image generated in step 904. The division is carried out pixel by pixel, applying the algorithm: image=material*illumination. In step 908, the CPU 12 outputs the material image and the illumination image.

FIG. 10 is a flow chart for calculating a max envelope value (step 902 of FIG. 9), according to a feature of the present invention. In step 910, the CPU 12 is given the log color space values corresponding to the (u, v) pairs in a selected bin of the chromaticity plane estimated by the CPU 12, and the normal, N for that plane. The CPU 12 then sorts by intensity the values of the colors of the log values for the pixels corresponding to the (u, v) values of the bin (step 914).

In step 916, the CPU 12 selects the envelope value for the bin using one of several methods: max, set percentile, isodata and barbell. In max, the CPU 12 simply selects the value with the highest intensity among the pixels corresponding to the (u, v) values of the bin. In set percentile, the CPU 12 selects the value at some fixed percentile of the value range for the bin, for example, the $95^{th}$ percentile.

FIG. 11 is a flow chart for calculating a max envelope value using isodata, according to a feature of the present invention. In step 920, the CPU 12 starts with the log color values corresponding to the (u, v) values of a selected bin of the chromaticity plane estimated by the CPU 12, for example, through execution of the routines of FIGS. 5-7. In step 922, the CPU 12 executes a known isodata algorithm to generate two clusters of the log color space pixels corresponding to the (u, v) values: a bright cluster and a dark cluster. In step 924 the CPU 12 calculates the mean value of the measurements in the bright cluster. In step 926, the CPU 12 optionally increases the mean value by a percentage, for example, 10% to generate the envelope value for the selected bin. In step 928, the CPU 12 outputs the envelope value for the bin (corresponding to step 918 of FIG. 10).

FIG. 12 is a graph illustrating a barbell concept in log color space, according to a feature of the present invention. In an image with significant shadows, many bins of the chromaticity plane contain clusters of bright values and dark values for a single material, with a small, but evenly distributed number of values between the bright and dark clusters. This is shown in FIG. 12 by the histogram of distances along the log plane normal in the log color space for the pixels of Material B corresponding to a selected bin of the chromaticity plane. Due to material variation and noise in the image, the bright and dark clusters tend to form separate Gaussian distributions. Overall, the two Gaussian distributions, connected by a bridge of penumbra values, have a barbell shape that can be expressed as a mathematical model. If the values within a bin fit the barbell model, then the mathematical properties of the barbell model can be used to estimate the degree of illumination of each pixel within the bin.

Referring now to FIG. 13 there is shown a flow chart for calculating a max envelope value using the barbell model, according to a feature of the present invention. In step 930, the CPU 12 is input log color space measurements corresponding to (u, v) values within a selected bin of the chromaticity plane estimated by the CPU 12, for example, through execution of the routines of FIGS. 5-7, as well as the normal, N, to the plane. The input values of step 930 are illustrated in FIG. 12. In step 932, the CPU 12 calculates the distance, $D_i$, of each pixel, $P_i$, of Material B, along the normal N. This is done by projecting the log color values onto the line N, $D_i$=dot($P_i$, N). In step 934, the CPU 12 generates a one dimensional distance histogram, $H_D$, of the $D_i$ values, dividing the histogram into K segments or buckets, for example, 100 buckets along the length of N, between the lowest length value of $D_i$ along N, $D_{min}$, and the highest length value, $D_{max}$, as shown in the bar graph configuration of FIG. 12.

In step 936, the CPU 12 initializes the barbell model from H. The barbell model can be stated as: $B(x)=A_1 e^{-(x-c1/\sigma 1)2} + A_2 e^{-(x-c2/\sigma 2)2} + A_s^2[(1/1+e^{10(x-c1)})-(1/1+e^{10(x-c2)})]$, where B(x): the frequency of occurrence of a particular pixel of the log color space ($D_i$);

x: the distance along N of the particular pixel (dot($P_i$, N));

$A_1$: amplitude of Gaussian for dark pixels;

$A_2$: amplitude of Gaussian for bright pixels;

$c_1$: center of Gaussian for dark pixels;

$c_2$: center of Gaussian for bright pixels;

$\sigma_1$: standard deviation of Gaussian for dark pixels;

$\sigma_2$: standard deviation of Gaussian for bright pixels;

$A_s$: amplitude of the step between the Gaussians.

According to the present invention, the barbell model is initialized by dividing the distance histogram projected onto N into a dark half and a bright half, and locating a peak value for each half. The center of each Gaussian half ($c_1$ and $c_2$) is initialized to the respective peak location. The amplitude of each Gaussian half ($A_1$ and $A_2$) is initialized to the respective peak amplitude. The standard deviation of each Gaussian ($\sigma_1$ and $\sigma_2$) is initialized to a fraction, for example, one tenth, of the distance along N between the peaks. Finally, the step amplitude ($A_s$) is initialized to a fraction, for example, one fourth, of the average magnitude of the distance histogram.

When the barbell model has been initialized, the CPU 12 proceeds to step 938 to fit the barbell model to the histogram data. The CPU 12 can utilize a non-linear optimization algorithm to fit the barbell model to the distance histogram. A standard, known algorithm is the Levenberg-Marqhardt non-linear fitting algorithm. The evaluation of the fit between the model and the histogram values can be based upon the following factors:

1. Set a minimum value for the sum-squared error of the model and the histogram data.
2. Set a minimum difference between the initial histogram peak locations and the model peak locations.
3. Set a minimum relative peak size relative to the average magnitude of the histogram values.

In the event a fit is found between a distance histogram H and the barbell model, the CPU 12 proceeds to step 940, to determine the mean for the pixel values in the barbell bright peak distribution bucket, and sets that value as the envelope value for the corresponding bin of the chromaticity plane. If there is not a good fit, the CPU 12 can proceed to determine an envelope value using one of the other methods delineated in step 916 of FIG. 10.

In step 942, the CPU 12 estimates $\|N\|$ and calculates the spectral ratio for the image, S. The distance between the dark and bright peak buckets of the histogram can be taken as the $\|N\|$ of the normal, N. The spectral ratio can be determined through use of the algorithm: S=1/exp(N)−1). In step 944, the CPU 12 outputs the envelope value for the selected bin and the estimate of S. The barbell model can also be used to estimate the percent of direct illuminant on each pixel within the selected bin. The percent of the direct illuminant for a selected pixel is simply the fraction of the distance from the dark peak to the bright peak of the barbell that the subject pixel projects onto N.

Returning to FIG. 10, after completion of one of the methods of step 916, the CPU 12, in step 918, outputs the envelope value for the selected bin. The CPU 12 repeats the routine of FIG. 10 for each bin of the chromaticity plane to generate a set of envelope values for the bins of the chromaticity plane.

FIG. 14 is a flow chart for creating a bi-illuminant, log color space, illumination invariant chromaticity plane with a manual input by a user, according to a feature of the present invention. In step 100, the CPU 12 accesses an image file 18. In two input steps for the CPU 12, the user selects a point or region on a fully lit (Bright) material of the image 18 selected by the user (step 102) and a point or region on a fully shadowed (Dark) part of the same material in the same image 18 (step 104). These steps 102, 104 can be implemented by an interactive clicking by the user on the monitor 20 operating to display the subject image file 18. A user can select such regions because human eye physiology is capable of distinguishing between shadows and actual physical objects.

In step 106, the CPU 12 calculates a term $P_b$=log(average of lit area) and a term $P_d$=log(average of shadow area), the lit and shadow areas corresponding to the pixels of the areas selected by the user in steps 102, 104. In step 108, the CPU 12 estimates an orientation for the normal N by calculating the normal for the chromaticity plane, $N=P_b-P_d$. The CPU 12 also calculates $N_{norm}=N/\|N\|$. In step 110, the CPU 12 builds a u, v chromaticity plane defined by the normal to the plane N determined from the user inputs, as described above. As in the chromaticity plane shown in FIG. 4, the co-ordinates of the plane, u, v can be defined by a projection of the green axis onto the chromaticity plane as the u axis, and the product of u and N being defined as the v axis. In step 112, the CPU projects the pixels of the image file 18 onto the chromaticity plane, as described above with respect to FIG. 4, such that each pixel, p(x, y, R, G, B) of the image file 18 is replaced by a chromaticity representation value, p(n, m, u, v). In step 114, the CPU 12 returns a chromaticity representation of the image file 18.

FIG. 15 is a flow chart for creating an illumination invariant chromaticity plane using a spectral ratio, according to a feature of the present invention. In this embodiment of the present invention, an estimate for orientation for the normal N for the chromaticity plane is determined using a spectral ratio for an image depicted in an image file 18. As noted above, methods for determining a characteristic spectral ratio for an image is disclosed in co-pending application Ser. No. 11/341,742, filed on Jan. 27, 2006, entitled: "Method and System For Identifying Illumination Flux In An Image." Moreover, a spectral ratio can be calculated using the shadow (dark) and lit (bright) color values selected by a user in the embodiment of the invention shown in FIG. 14, using the algorithm: $S_{vector}=Dark_{vector}/(Bright_{vector}-Dark_{vector})$, wherein $S_{vector}$ is an unnormalized spectral ratio.

According to a feature of the present invention, the relationship between the spectral ratio and the normal N to the chromaticity plane is expressed by the algorithm: $N=\log(1+1/S_{vector})$. Thus, in the routine of FIG. 15, this algorithm is utilized by the CPU 12 to determine an optimal estimate for the orientation for the normal N and build the chromaticity plane. In step 200, each of an image file 18 and the spectral ratio for the image depicted in the image file 18 are input to the CPU 12. In step 202, the CPU 12 calculates N and $N_{norm}$, as shown in FIG. 15. In steps 204, 206, the CPU 12 builds a u, v chromaticity plane defined by the normal to the plane N (step 204), and then projects the pixels of the image file 18 onto the chromaticity plane (step 206), as described above with respect to the routine of FIG. 14. Thus, each pixel, p(x, y, R, G, B) of the image file 18 is replaced by a chromaticity representation value, p(n, m, u, v). In step 208, the CPU 12 returns a chromaticity representation of the image file 18.

In the case of the use of a characteristic spectral ratio to estimate N, a calibration target can be installed in a scene depicted in an image, for example, sensed by a camera installed in a robot device operating at the scene. The calibration target can be situated on a shadow boundary to facilitate calculation of a characteristic spectral ratio using any of the methods of the co-pending application Ser. No. 11/341,742. A calibration target need not be a special surface or device installed into a scene. Any reasonably uniform natural surface, such as concrete or asphalt, onto which a shadow falls in a predictable location can serve as a calibration target. For example, for a stationary security camera, the location of a shadow cast by an immovable object like a building in the scene can be predetermined for each time of day given the known location of the sun and orientation of the building. In such a case, calculating the average of the known lit area and the average of the known dark area, both on the same material, provides the necessary information for calculating Svector, N and Nnorm, as described above. The use of a spectral ratio to estimate N provides a computationally simple approach that permits real time execution for determination of chromaticity values, as required in a security camera or robot application.

In the preceding specification, the invention has been described with reference to specific exemplary embodiments and examples thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. An automated computerized method for generating an illumination invariant, chromaticity representation of an image, comprising the steps of:
   a computer executing the following steps:
   providing an image comprising an array of pixels, each pixel having N band color values;
   transforming the N bands to log color space values in a log color space;
   generating a bi-illuminant chromaticity plane in the log color space; and
   projecting the log color space values to the chromaticity plane to provide chromaticity representation values corresponding to the pixels of the image.

2. The method of claim 1, comprising the further step of mapping N band values of the pixels to the corresponding chromaticity representation values to generate a chromaticity representation of the image.

3. The method of claim of claim 1, wherein the N bands comprise RGB values for each pixel.

4. The method of claim 1, wherein the step of generating a bi-illuminant chromaticity plane in the log color space is carried out by estimating an orientation of an optimal normal to the plane, N.

5. The method of claim 4, wherein the step of estimating an orientation of an optimal normal to the plane, N is carried out by executing an entropy minimization technique.

6. The method of claim 5 wherein the entropy minimization technique is executed by executing a search algorithm for establishing a selection of orientations of the normal, N, for each selected orientation, estimating the entropy of the selected orientation, and selecting N corresponding to the orientation with a minimum estimated entropy.

7. The method of claim 6 wherein the search algorithm is selected from the group consisting of an exhaustive search algorithm, a univariate search algorithm, and a simulated annealing search algorithm.

8. The method of claim 6 wherein the step of estimating the entropy of the selected orientation is carried out by building a histogram of the chromaticity representation values, dividing the histogram into an array of bins, for each bin, calculating a probability of occupation by chromaticity representation values and calculating an entropy as a function of the probability of occupation, and summing the entropy calculations for all bins of the histogram.

9. The method of claim 5 wherein the entropy minimization technique is executed by executing a constrained search method.

10. The method of claim 9, wherein the step of executing a constrained search method is carried out by estimating entropy at each of an increment between bounds for a magnitude of a spectral ratio for the image, incrementing between the bounds by a preselected incremental amount.

11. The method of claim 10, wherein, at each increment of the magnitude, N is selected as N=log(1+1/(M Sn).

12. The method of claim 10 comprising the further step of iterating the step of incrementing, reducing the increment for a subsequent iteration.

13. The method of claim 4, wherein the step of estimating an orientation of an optimal normal to the plane, N is carried out by manually selecting lit and shadow portions of a material depicted in the image, and utilizing the selected portions to determine an estimate of the orientation.

14. The method of claim 13, wherein the step of utilizing the selected portions to determine an estimate of the orientation is carried out by estimating an orientation as a function of a log(average of lit area) and a log(average of shadow area).

15. The method of claim 4, wherein the step of estimating an orientation of an optimal normal to the plane, N is carried out by estimating the orientation as a function of a characteristic spectral ratio of the image.

16. The method of claim 15, wherein the step of estimating the orientation as a function of a characteristic spectral ratio of the image is carried out by executing $N=\log(1+1/S_{vector})$, wherein $S_{vector}$ is the characteristic spectral ratio.

17. An automated computerized method for generating an illumination invariant, material image, comprising the steps of:
a computer executing the following steps:
providing an original image comprising an array of pixels, each pixel having N band color values;
generating a histogram on a bi-illuminant chromaticity plane, the histogram being divided into bins;
calculating an envelope value for each bin of the histogram;
co-relating each of the pixels of the original image to a corresponding bin of the histogram; and mapping the N band color values of each pixel to the envelope value of the co-related bin to provide the material image.

18. The method of claim 17 comprising the further step of utilizing the material image to generate an illumination image.

19. The method of claim 17 wherein the step of calculating an envelope value for each bin of the histogram is carried out by sorting pixels corresponding to the bin by intensity of the N band color values and selecting the envelope value as a function of the intensity of the N band color values.

20. The method of claim 19 wherein the step of selecting the envelope value as a function of the intensity of the N band color values is carried out by selecting a maximum value of the intensity as the envelope value.

21. The method of claim 19 wherein the step of selecting the envelope value as a function of the intensity of the N band color values is carried out by selecting a set percentile intensity.

22. The method of claim 19 wherein the step of selecting the envelope value as a function of the intensity of the N band color values is carried out by calculating the envelope value using isodata of the intensity of the N band color values.

23. The method of claim 22 wherein the step of calculating the envelope value using isodata of the intensity of the N band color values is carried out by executing an isodata algorithm to generate bright and dark clusters of values, and calculating a mean value for the values in the bright cluster as the envelope value.

24. The method of claim 19 wherein the step of selecting the envelope value as a function of the intensity of the N band color values is carried out by using a barbell model.

25. The method of claim 24 wherein the step of calculating the envelope value using a barbell model is carried out by generating a one dimensional histogram on a normal to the chromaticity plane based upon the intensity of the N band color values, initializing a barbell model using values from the one dimensional histogram and fitting the barbell model to the one dimensional histogram.

26. A computer system which comprises:
a CPU; and
a memory storing an image file defining an image comprising an array of pixels, each pixel having N band color values;
the CPU being arranged and configured to execute a routine:
to transform the N bands to log color space values in a log color space;
to generate a bi-illuminant chromaticity plane in the log color space; and
to project the log color space values to the chromaticity plane to provide chromaticity representation values corresponding to the pixels of the image.

27. A computer system which comprises:
a CPU; and
a memory storing an image file defining an image comprising an array of pixels, each pixel having N band color values;
the CPU being arranged and configured to execute a routine:
to generate a histogram on a bi-illuminant chromaticity plane, the histogram being divided into bins;
to calculate an envelope value for each bin of the histogram;
to co-relate each of the pixels of the original image to a corresponding bin of the histogram; and
to map the N band color values of each pixel to the envelope value of the co-related bin to provide a material image.

28. A computer program product, disposed on a computer readable media, the product including computer executable process steps operable to control a computer to:
provide an image comprising an array of pixels, each pixel having N band color values;
transform the N bands to log color space values in a log color space;
generate a bi-illuminant chromaticity plane in the log color space; and
project the log color space values to the chromaticity plane to provide chromaticity representation values corresponding to the pixels of the image.

29. A computer program product, disposed on a computer readable media, the product including computer executable process steps operable to control a computer to:
   generate a histogram on a bi-illuminant chromaticity plane, the histogram being divided into bins;
   calculate an envelope value for each bin of the histogram;
   co-relate each of the pixels of the original image to a corresponding bin of the histogram; and
   map the N band color values of each pixel to the envelope value of the co-related bin to provide a material image.

* * * * *